US011059131B2

(12) United States Patent
Piech et al.

(10) Patent No.: US 11,059,131 B2
(45) Date of Patent: Jul. 13, 2021

(54) METHODS FOR LASER PROCESSING A SUBSTRATE STACK HAVING ONE OR MORE TRANSPARENT WORKPIECES AND A BLACK MATRIX LAYER

(71) Applicant: CORNING INCORPORATED, Corning, NY (US)

(72) Inventors: Garrett Andrew Piech, Corning, NY (US); Kristopher Allen Wieland, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 218 days.

(21) Appl. No.: 16/430,985

(22) Filed: Jun. 4, 2019

(65) Prior Publication Data
US 2019/0389007 A1 Dec. 26, 2019

Related U.S. Application Data

(60) Provisional application No. 62/688,711, filed on Jun. 22, 2018.

(51) Int. Cl.
*B23K 26/364* (2014.01)
*C03C 23/00* (2006.01)
*B23K 103/00* (2006.01)

(52) U.S. Cl.
CPC ........ *B23K 26/364* (2015.10); *C03C 23/0025* (2013.01); *B23K 2103/54* (2018.08)

(58) Field of Classification Search
CPC .................................................. C03B 33/0222
See application file for complete search history.

(56) References Cited

U.S. PATENT DOCUMENTS 9,701,563 B2    7/2017   Bookbinder et al.
9,737,315 B2    8/2017   Birmingham
(Continued)

FOREIGN PATENT DOCUMENTS

CN      1473087 A     2/2004
CN   103178160 A     6/2013
(Continued)

OTHER PUBLICATIONS

International Search Report and Written Opinion of the International Searching Authority; PCT/USI9/036694; dated Sep. 9, 2019; 10 Pages; European Patent Office.
(Continued)

*Primary Examiner* — Ian A Rummel
(74) *Attorney, Agent, or Firm* — Smit Kapadia

(57) ABSTRACT

A method for laser processing a substrate stack includes forming a defect in a transparent workpiece of the substrate stack having a black matrix layer. Forming the defect includes directing a portion of a pulsed laser beam into the transparent workpiece. The pulsed laser beam includes a wavelength λ, a spot size $w_o$, and a Rayleigh range $Z_R$ that is greater than $$F_D \frac{\pi w_0^2}{\lambda},$$

where $F_D$ is a dimensionless divergence factor comprising a value of 10 or greater. The pulsed laser beam directed into the transparent workpiece of the substrate stack forms a pulsed laser beam focal line disposed within the transparent workpiece, where a center of the pulsed laser beam focal line is offset from an edge of the black matrix layer by a distance (Continued)

that is about 20% or less of a total thickness of the substrate stack and generates an induced absorption within the transparent workpiece.

20 Claims, 16 Drawing Sheets

(56) References Cited

U.S. PATENT DOCUMENTS

| | | |
|---|---|---|
| 9,815,144 B2 | 11/2017 | Grundmueller et al. |
| 9,815,730 B2 | 11/2017 | Marjanovic et al. |
| 9,850,159 B2 | 12/2017 | Bhuyan et al. |
| 9,850,160 B2 | 12/2017 | Marjanovic et al. |
| 10,047,001 B2 | 8/2018 | West |
| 10,173,916 B2 | 1/2019 | Bankaitis et al. |
| 10,179,748 B2 | 1/2019 | Marjanovic et al. |
| 10,252,931 B2 | 4/2019 | N'Gom et al. |
| 10,280,108 B2 | 5/2019 | Bohme |
| 10,293,436 B2 | 5/2019 | Marjanovic et al. |
| 10,335,902 B2 | 7/2019 | Bookbinder et al. |
| 2015/0165548 A1 | 6/2015 | Marjanovic et al. |
| 2015/0165560 A1 | 6/2015 | Hackert et al. |
| 2015/0165563 A1 | 6/2015 | Manley et al. |
| 2015/0166393 A1 | 6/2015 | Marjanovic et al. |
| 2015/0179855 A1 | 6/2015 | Huang |
| 2015/0360991 A1 | 12/2015 | Grundmueller et al. |
| 2016/0009066 A1 | 1/2016 | Nieber et al. |
| 2016/0279895 A1 | 9/2016 | Marjanovic et al. |
| 2016/0311717 A1 | 10/2016 | Nieber et al. |
| 2017/0001900 A1 | 1/2017 | Marjanovic et al. |
| 2017/0008122 A1 | 1/2017 | Wieland et al. |
| 2017/0023841 A1 | 1/2017 | N'Gom et al. |
| 2017/0158550 A1 | 6/2017 | Genier |
| 2017/0158551 A1 | 6/2017 | Bookbinder et al. |
| 2017/0189991 A1 | 7/2017 | Gollier et al. |
| 2017/0189999 A1 | 7/2017 | Bookbinder et al. |
| 2018/0029919 A1 | 2/2018 | Schnitzler et al. |
| 2018/0057390 A1 | 3/2018 | Hackert et al. |
| 2018/0062342 A1 | 3/2018 | Comstock, II et al. |
| 2018/0093914 A1 | 4/2018 | Akarapu et al. |
| 2018/0105451 A1 | 4/2018 | Wieland |
| 2018/0111870 A1 | 4/2018 | Herrnberger et al. |
| 2018/0118602 A1 | 5/2018 | Hackert et al. |
| 2018/0118603 A1 | 5/2018 | Nieber et al. |
| 2018/0345419 A1 | 12/2018 | Mikutis |
| 2019/0144325 A1 | 5/2019 | Bowden et al. |

FOREIGN PATENT DOCUMENTS

| | | |
|---|---|---|
| EP | 1974848 A1 | 10/2008 |
| EP | 2143518 A1 | 1/2010 |

OTHER PUBLICATIONS

Borghi et al; "M2 Factor of Bessel-Gauss Beams"; Optics Letters, vol. 22, No. 5, 1997 pp. 262-264.

Siegman; "New Developments in Laser Resonators"; Proc. SPIE, 1224, Optical Resonators (1990) pp. 2-14.

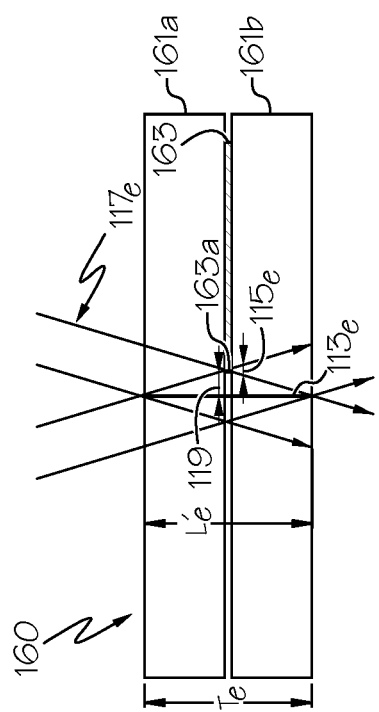

METHODS FOR LASER PROCESSING A SUBSTRATE STACK HAVING ONE OR MORE TRANSPARENT WORKPIECES AND A BLACK MATRIX LAYER

This application claims the benefit of priority to U.S. Provisional Application Ser. No. 62/688,711 filed on Jun. 22, 2018, the content of which is relied upon and incorporated herein by reference in its entirety.

BACKGROUND

Field

The present specification generally relates to apparatuses and methods for laser processing transparent workpieces, and more particularly, laser processing transparent workpieces arranged in a substrate stack that include a black matrix layer.

Technical Background

The area of laser processing of materials encompasses a wide variety of applications that involve cutting, drilling, milling, welding, melting, etc. of different types of materials. Among these processes, one that is of particular interest is cutting or separating different types of transparent materials in a process that may be utilized in the production of substrates such as glass, sapphire, or fused silica for thin film transistors (TFT) or display materials for electronic devices.

From process development and cost perspectives there are many opportunities for improvement in cutting and separating glass substrates. It is of great interest to have a faster, cleaner, cheaper, more repeatable, and more reliable method of separating glass substrates that may have pre-applied coatings such as a black matrix layer than what is currently practiced in the market. Accordingly, a need exists for alternative improved methods for separating glass substrates.

SUMMARY

According to one embodiment, a method for laser processing a substrate stack includes forming a defect in a transparent workpiece of the substrate stack where the substrate stack further includes a black matrix layer. Forming the defect includes directing a portion of a pulsed laser beam into the transparent workpiece wherein the pulsed laser beam includes a wavelength λ, a spot size $w_o$, and a Rayleigh range $Z_R$ that is greater than $$F_D \frac{\pi w_0^2}{\lambda},$$

where $F_D$ is a dimensionless divergence factor comprising a value of 10 or greater. The pulsed laser beam directed into the transparent workpiece of the substrate stack forms a pulsed laser beam focal line disposed within the transparent workpiece, where a center of the pulsed laser beam focal line is offset from an edge of the black matrix layer by a distance that is about 20% or less of a total thickness of the substrate stack. The pulsed laser beam focal line generates an induced absorption within the transparent workpiece. The pulsed laser beam focal line comprises an effective line length that is less than or equal to about 1.2 times the total thickness of the substrate stack.

In some embodiments, a method for laser processing a substrate stack includes forming a defect in a transparent workpiece of the substrate stack, the substrate stack further comprising a black matrix layer. Forming the defect includes directing a pulsed laser beam oriented along a beam pathway and output by a beam source through an aspheric optical element, through a focusing optic, and into the substrate stack such that the pulsed laser beam directed into the transparent workpiece of the substrate stack forms a pulsed laser beam focal line disposed within the transparent workpiece where a center of the pulsed laser beam focal line is offset from an edge of the black matrix layer by a distance that is about 20% or less of a total thickness of the substrate stack. The pulsed laser beam focal line generates an induced absorption within the transparent workpiece. The pulsed laser beam directed into the transparent workpiece comprises a numerical aperture of 0.05 to 0.4.

In some embodiments, a glass article includes a glass substrate having an edge defining a perimeter of the glass substrate, a black matrix layer disposed on the glass substrate, and a plurality of vertical striations formed on the edge of the glass substrate. The plurality of vertical striations include a pitch of about 50 microns or less and extend through at least 50% of a thickness of the glass substrate and the black matrix layer is offset by a distance from the edge of the glass substrate by about 20% or less a total thickness of the glass article.

Additional features and advantages of the processes and systems described herein will be set forth in the detailed description, which follows, and in part will be readily apparent to those skilled in the art from that description or recognized by practicing the embodiments described herein, including the detailed description, the claims, and the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 5E schematically shows a black matrix layer offset from the pulsed laser beam focal line, according to one or more embodiments shown and described herein;

DETAILED DESCRIPTION

Figure 1:
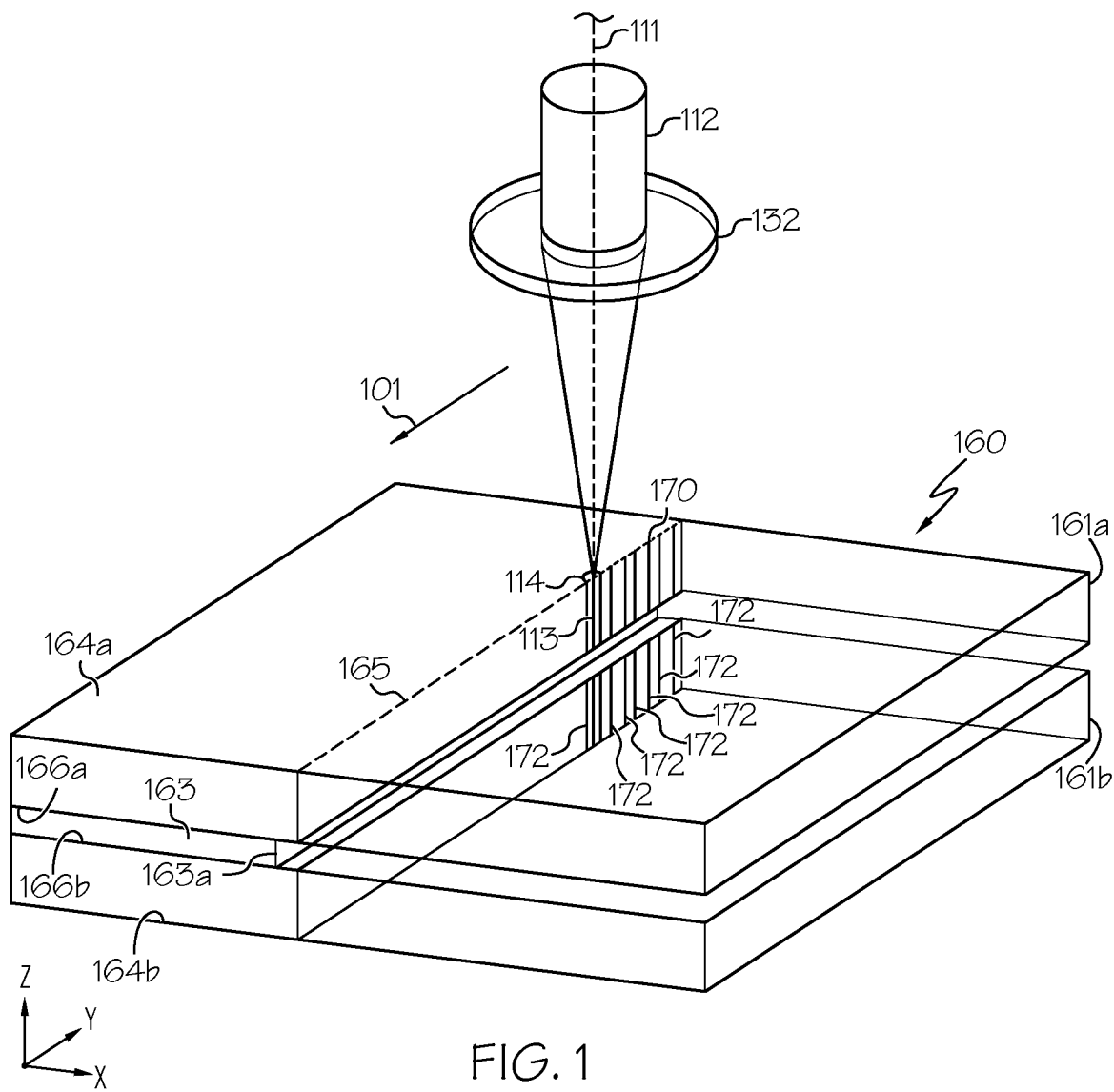
FIG. 1 schematically depicts the formation of a contour of defects in a transparent workpiece having a black matrix layer positioned there between, according to one or more embodiments shown and described herein.

Light plays an important role in the operation of consumer electronics displays and may be coupled into the display via the edges of the glass (i.e., edge lit) or behind the display (i.e., back lit), then filtered to create the desired display in an active area of the display. However, light that is coupled into the display will continue to propagate outside of the active area into unwanted areas. Without mitigation, light would propagate outward from unwanted locations of the display, such from the edges of the display, generating distracting and unwanted aesthetics. Currently, manufacturers remove this unwanted light by placing bezels around the edge of the display, which capture light and prevent it from escaping. However, modern displays are moving away from bezels. Thus, new methods of blocking unwanted light are needed.

Displays may comprise a stack of material (e.g., a substrate stacks), for example, two pieces of display glass (e.g., transparent workpieces) may be adhered to each other to create a final display. These substrate stacks may further comprise interlayers, for example an absorbing layer, such as a black matrix layer, which provides a method of mitigating unwanted light without a bezel. As used herein, "black matrix", refers to a material layer of the substrate stack, such as an interlayer, that blocks, absorbs or otherwise prevents light from reaching undesired areas of the substrate stack. These undesirable areas may include the edge of the substrate stack, the inter-pixel areas of the substrate stack and/or thin film transistors disposed within the substrate stack. In some embodiments, the black matrix layer blocks, absorbs or otherwise prevents about 50%, 55%, 60%, 65%, 70%, 75%, 80%, 85%, 90%, 92%, 94%, 95%, 96%, 97% 98%, 99%, 99.5%, or the like, of light from reaching undesired areas of the substrate stack.

Although the term "black matrix" is used herein, other types of coating layers (e.g. a polymer coating, an organic coating, a dark or absorbing coating, or the like) may replace the black matrix layer without departing from the spirit and scope of the claimed subject matter. To maximize the effect of the black matrix, the black matrix layer should extend near the edge of the display. The farther the edge of the black matrix layer is from the edge of the display, the more unwanted light can escape. Thus, positioning the black matrix at or near the edge of the display is desired.

During manufacturing, the glass sheets that form the displays may be large sheets of glass, referred to as mother sheets. These mother sheets may contain many display panels arranged to maximize the glass utilization, which allows mother sheets to be processed in parallel until individual panels are singulated. Singulation from the mother sheet into individual display panels may be accomplished in several ways, such as mechanically scored and separated, laser processed, or the like. Because of the demand to form display sheets closer together to maximize mother sheet utilization and create free form (non-rectangular) shapes, an increase need in improved laser processing is needed.

In some embodiments, laser processing substrate stacks includes focusing a pulsed laser beam into a pulsed laser beam focal line positioned adjacent a black matrix layer. That is, the full body defects may be offset by a distance from the black matrix layer that is deposited on a transparent workpiece of a substrate stack. In other embodiments, laser processing substrate stacks includes focusing a pulsed laser beam into a pulsed laser beam focal line that generates full body defects in the substrate stack and through the black matrix layer that is deposited on the transparent workpiece. In both instances, when laser processing the substrate stack, which includes a black matrix layer, it may be difficult to prevent damage to the black matrix layer. Damage to the black matrix can have adverse effects on the final display performance. For example, light from the display may leak out around the edges of the black matrix layer. Because of damage to the black matrix layer, after the display panels are singulated, they must be edge finished, i.e., through mechanical grinding and polishing. As such, method and systems are described herein to laser processing substrate stacks having one or more transparent workpieces, which may be glass sheets, and a black matrix layer while minimizing undesirable effects on the black matrix layer.

Reference will now be made in detail to embodiments of processes for laser processing substrate stacks, which include one or more transparent workpieces, such as glass workpieces, and a black matrix layer, examples of which are illustrated in the accompanying drawings. Whenever possible, the same reference numerals will be used throughout the drawings to refer to the same or like parts.

The phrase "contour line," as used herein, denotes a line (e.g., a line, a curve, etc.) of intended separation on the surface of a transparent workpiece along which the transparent workpiece will be separated into multiple portions upon exposure to the appropriate processing conditions. Further, the phrase "contour," as used herein, refers to a plurality of defects in introduced into the transparent workpiece using various techniques along the contour line. Moreover, as used herein, a "defect" may include an area of modified material (relative to the bulk material), void space, scratch, flaw, hole, or other deformities in the transparent workpiece which enables separation of material of the transparent mother sheet along the contour lines and closed contour lines (e.g., separation of the contours and the closed contours) to form transparent articles from the transparent mother sheets by additional processing, such as by infrared laser processing, mechanical stress, or other separation processes. The defects may penetrate the full depth of the glass. It should be understood that while sometimes described as "holes" or "hole-like," the defects disclosed herein may generally not be void spaces, but are rather portions of the workpiece which has been modified by laser processing as described herein. These defects may be referred to, in various embodiments herein, as line defects, perforations, or nano-perforations in the workpiece.

In operation, a transparent workpiece may be separated into multiple portions by first forming a contour in the transparent workpiece and, thereafter, heating, for example, using an infrared laser (e.g., a $CO_2$ laser, CO laser, or the like), the surface of the transparent workpiece on the contour to create stresses in the transparent workpiece, such as thermal stresses. The stresses ultimately lead to the separation of the transparent workpiece along the contour. Further, in some embodiments, such as an embodiment in which the transparent workpiece is strengthened (e.g., ion-exchanged) the subsequent separating step or a spontaneous break may occur due to stress present in the transparent workpiece, depending on the type, thickness, and structure of the transparent workpiece. For example, stress may be present in the transparent workpiece after strengthening the transparent workpiece, which may cause spontaneous separation of the transparent workpiece along the contour without further heating or mechanical separation steps.

After separation, the modifications (e.g., defects) may present as vertical striations on the edges, which are defined by the separated surfaces formed when the transparent workpiece is separated into two or more portions along the contour. In some embodiments, the vertical striations include a pitch of about 50 microns or less than and extend through at least 50% of the thickness of the substrate stack. In some embodiments, the vertical striations extend through 100% of the thickness of the substrate stack. Additionally, the distance (for example, the distance 119 depicted in FIG. 5E) between the edge of the transparent workpiece and the black matrix layer is about 20% or less the total thickness of the substrate stack. In some embodiments, the distance 119 is about 15% or less of the total thickness of the substrate stack. In some embodiments, the distance 119 is about 10% or less of the total thickness of the substrate stack. The numerical aperture ("NA") and the length of the focal line, which are described in more detail herein, effect the distance 119 (FIG. 5E) at which the center of the laser beam may be offset from the edge of the black matrix layer while maintaining low or no damage to the black matrix layer.

Further, to reduce undesirable effects on the black matrix layer the pulsed laser beam directed into the transparent workpiece includes a numerical aperture of about 0.05 to about 0.4 and/or a pulsed laser beam focal line having a line length of specified position and length to reduce damage to the black matrix layer. Embodiments described herein may be useful for forming contours in a transparent workpiece comprising a black matrix layer.

The phrase "transparent workpiece," as used herein, means a workpiece formed from glass or glass-ceramic which is transparent, where the term "transparent," as used herein, means that the material has an optical absorption of less than about 20% per mm of material depth, such as less than about 10% per mm of material depth for the specified pulsed laser wavelength, or such as less than about 1% per mm of material depth for the specified pulsed laser wavelength. According to one or more embodiments, the transparent workpiece may have a thickness of from about 50 microns (μm) to about 10 mm (such as from about 100 μm to about 5 mm, from about 0.5 mm to about 3 mm, or from about 100 μm to about 2 mm, for example, 100 μm, 250 μm, 300 μm, 500 μm, 700 μm, 1 mm, 1.2 mm, 1.5 mm, 2 mm, 5 mm, 7 mm, or the like.

According to one or more embodiments, the present disclosure provides methods for processing workpieces. As used herein, "laser processing" may include forming contours in transparent workpieces, separating transparent workpieces, or combinations thereof. Transparent workpieces may comprise glass workpieces formed from glass compositions, such as borosilicate glass, soda-lime glass, aluminosilicate glass, alkali aluminosilicate glass, alkaline earth aluminosilicate glass, alkaline earth boro-aluminosilicate glass, fused silica, or crystalline materials such as sapphire, silicon, gallium arsenide, or combinations thereof. In some embodiments, the glass may be ion-exchangeable, such that the glass composition can undergo ion-exchange for mechanical strengthening before or after laser processing the transparent workpiece. For example, the transparent workpiece may comprise ion exchanged or ion exchangeable glass, such as Corning Gorilla® Glass available from Corning Incorporated of Corning, N.Y. (e.g., code 2318, code 2319, and code 2320). Further, these ion-exchanged glasses may have coefficients of thermal expansion (CTE) of from about 6 ppm/° C. to about 10 ppm/° C. In some embodiments, the glass composition of the transparent workpiece may include greater than about 1.0 mol. % boron and/or compounds containing boron, including, without limitation, $B_2O_3$. In another embodiment, the glass compositions from which the transparent workpieces are formed include less than or equal to about 1.0 mol. % of oxides of boron and/or compounds containing boron. Moreover, the transparent workpiece may comprise other components, which are transparent to the wavelength of the laser, for example, crystals such as sapphire or zinc selenide.

Some transparent workpieces may be utilized as display and/or TFT (thin film transistor) substrates. Some examples of such glasses or glass compositions suitable for display or TFT use are EAGLE XG®, CONTEGO, and CORNING LOTUS™ available from Corning Incorporated of Corning, N.Y. The alkaline earth boro-aluminosilicate glass compositions may be formulated to be suitable for use as substrates for electronic applications including, without limitation, substrates for TFTs. The glass compositions used in conjunction with TFTs typically have CTEs similar to that of silicon (such as less than $5\times10^{-6}$/K, or even less than $4\times10^{-6}$/K, for example, approximately $3\times10^{-6}$/K, or about $2.5\times10^{-6}$/K to about $3.5\times10^{-6}$/K), and have low levels of alkali within the glass. Low levels of alkali (e.g., trace amounts of about 0 wt. % to 2 wt. %, such as less than 1 wt. %, for example, less than 0.5 wt. %) may be used in TFT applications because alkali dopants, under some conditions, leach out of glass and contaminate or "poison" the TFTs, possibly rendering the TFTs inoperable. According to embodiments, the laser cutting processes described herein may be used to separate transparent workpieces in a controlled fashion with negligible debris, minimum defects, and low subsurface damage to the edges, preserving workpiece integrity and strength.

Figure 2:
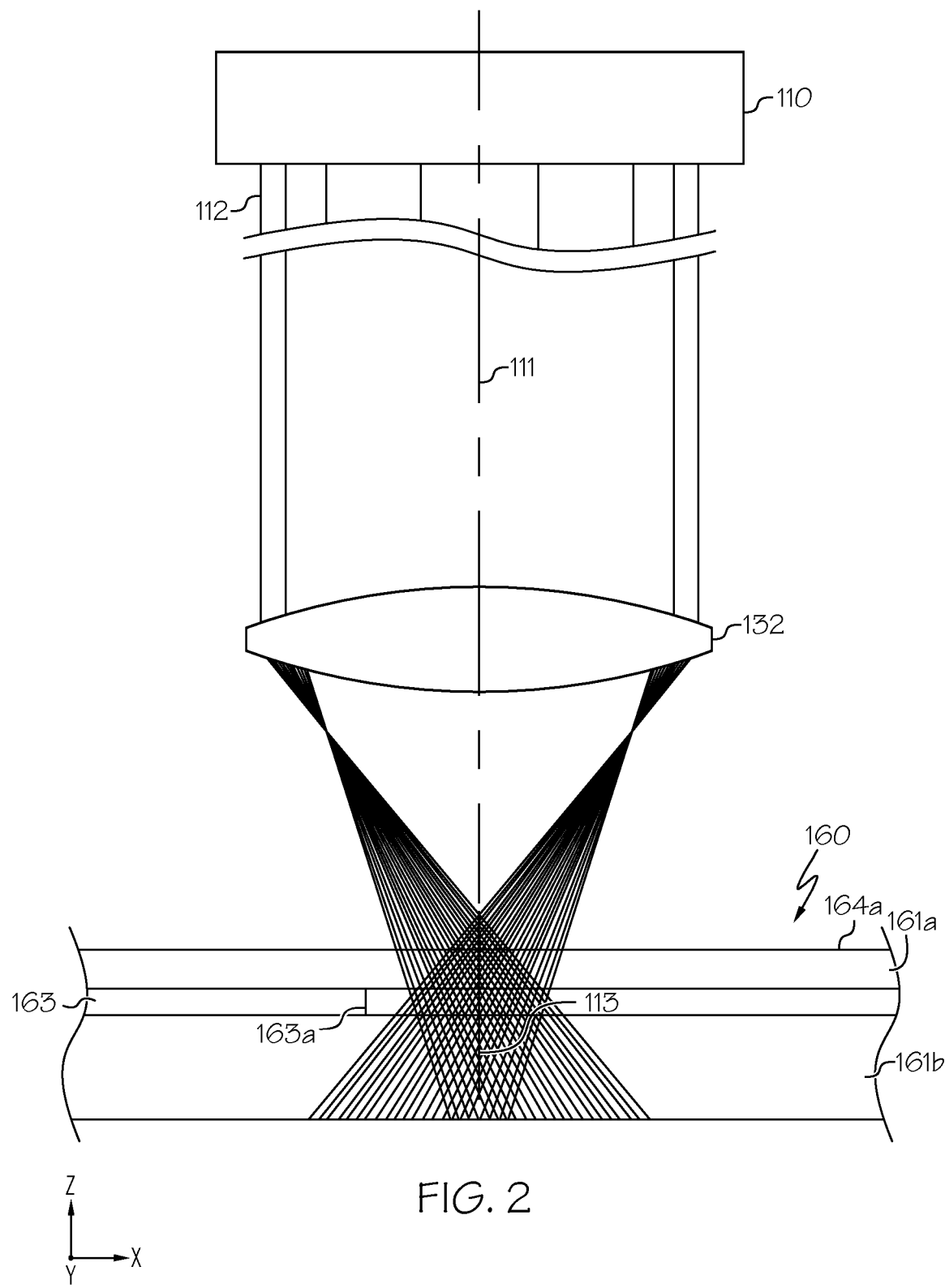
FIG. 2 schematically depicts a pulsed laser beam focal line irradiating a substrate stack having transparent workpieces and a black matrix layer disposed there between, according to one or more embodiments shown and described herein.

Referring now to FIGS. 1 and 2, by way of example, a substrate stack 160 is schematically depicted undergoing processing according to the methods described herein. The substrate stack 160 comprises a black matrix layer 163 having an edge 163a and one or more transparent workpieces 161, for example a first transparent workpiece 161a and a second transparent workpiece 161b. As depicted, the black matrix layer 163 is dispersed and bonded to the first transparent workpiece 161a and the second transparent workpiece 161b. The first transparent workpiece 161a and the second transparent workpiece 161b each comprise an outward facing surface 164a, 164b and an inward facing surface 166a, 166b. The outward facing surfaces 164a, 164b each face outward from the black matrix layer 163 and the inward facing surfaces 166a, 166b each face toward and contact the black matrix layer 163. As used herein, "target surface" is used to refer to the surface of the substrate stack 160 that is closest in proximity to the optics of the pulsed laser beam 112. For example, in the embodiment depicted in FIGS. 1 and 2, the outward facing surfaces 164a or 164b may be the target surface. While not depicted, in some embodiments, the substrate stack 160 may comprise additional layers, for example, additional transparent workpieces, black matrix layers, and/or other material layers.

The black matrix layer 163 may have a thicknesses from about 5 nm to about 100 micron and may comprise, for example, chromium. A chromium oxide adhesion layer may be deposited between a chromium metal layer and the first and second transparent workpieces 161a and 161b. In some embodiments, the material of the black matrix layer 163 may be a polymer material. In consumer electronic displays, light sources may be coupled to the display via the edges of the glass (e.g., edge lit) or coupled directly behind the display (e.g. back lit). In each of these cases, light is directed into the glass and is filtered to create the desired display. Without a black matrix layer 163 or beveled edges, the light directed into the displays may propagate outside of the active area and into unwanted areas. In operation, when the black matrix layer 163 is damaged light may leak from the active area of a display, which may be distracting to a viewer.

Returning to FIGS. 1 and 2, the formation of a contour 170 in the first and second transparent workpieces 161a, 161b (e.g., the one or more transparent workpieces 161) of the substrate stack 160 is depicted. Although FIGS. 1 and 2 depict the first and second transparent workpieces 161a, 161b, it should be understood that the one or more transparent workpieces 161 may comprise any number of transparent workpieces 161. In operation, the contour 170 may be formed by translating a pulsed laser beam 112 and the substrate stack 160 relative to one another such that the pulsed laser beam 112 translates relative to the substrate stack 160 in a translation direction 101. FIG. 1 depicts the pulsed laser beam 112 propagating along a beam pathway 111 and oriented such that the pulsed laser beam 112 may be directed through the outward facing surface 164a (e.g., target surface) and into the one or more transparent workpieces 161. The pulsed laser beam 112 forms a beam spot 114 projected onto the outward facing surface 164a of the first transparent workpiece 161a. As used herein, "beam spot" 114 refers to a cross section of a laser beam (e.g., the pulsed laser beam 112) at a point of contact with a component, for example, the interface of air with a transparent workpiece (e.g., the first transparent workpiece 161a).

In some embodiments, the pulsed laser beam 112 may be focused into a pulsed laser beam focal line 113 within the one or more transparent workpieces 161, using an aspheric optical element 120 (FIG. 3), for example, an axicon 122 and one or more lenses (e.g., a first lens 130 and a second lens 132, as described below and depicted in FIG. 3). In some embodiments, the pulsed laser beam focal line 113 is a portion of a quasi-non-diffracting beam, as defined in more detail below.

Referring still to FIGS. 1 and 2, the contour 170 extends along a contour line 165, which delineates a line of intended separation along a surface of a transparent workpiece (such as the outward facing surface 164a), along which the transparent workpiece, such as the first transparent workpiece 161a, may be separated into two or more portions. The contour 170 comprises a plurality of defects 172 that extend into the one or more transparent workpieces 161, for example, extend from the outward facing surface 164a (e.g. the target surface) into the one or more transparent workpieces 161, and establish a path for separation of the one or more transparent workpieces 161.

The pulsed laser beam 112 may be directed into the one or more transparent workpieces 161 (e.g., condensed into a high aspect ratio line focus that penetrates through at least a portion of the thickness of the one or more transparent workpieces 161). This forms the pulsed laser beam focal line 113. Further, the beam spot 114 is an example cross section of the pulsed laser beam focal line 113 and when the pulsed laser beam focal line 113 irradiates the one or more transparent workpieces 161 (forming the beam spot 114), the pulsed laser beam focal line 113 penetrates at least a portion of the one or more transparent workpieces 161.

In operation, the pulsed laser beam 112 may be translated relative to the substrate stack 160 (e.g., in the translation direction 101) to form the plurality of defects 172 of the contour 170 in the one or more transparent workpieces 161. Directing or localizing the pulsed laser beam 112 into the one or more transparent workpieces 161 generates an induced absorption within the one or more transparent workpieces 161 and deposits enough energy to break chemical bonds in the one or more transparent workpieces 161 at spaced locations along the contour line 165 to form the defects 172 of the contour 170. According to one or more embodiments, the pulsed laser beam 112 may be translated across the substrate stack 160 by motion of the substrate stack 160 (e.g., motion of one or more translation stages 190 (FIG. 3) coupled to the substrate stack 160 and/or the beam source 110), motion of the pulsed laser beam 112 (e.g., motion of the pulsed laser beam focal line 113), or motion of both the first and second transparent workpieces 161a, 161b and the pulsed laser beam focal line 113. By translating the pulsed laser beam focal line 113 relative to the first and second transparent workpieces 161a, 161b, the plurality of defects 172 may be formed in the first and second transparent workpieces 161a, 161b.

Figure 3:
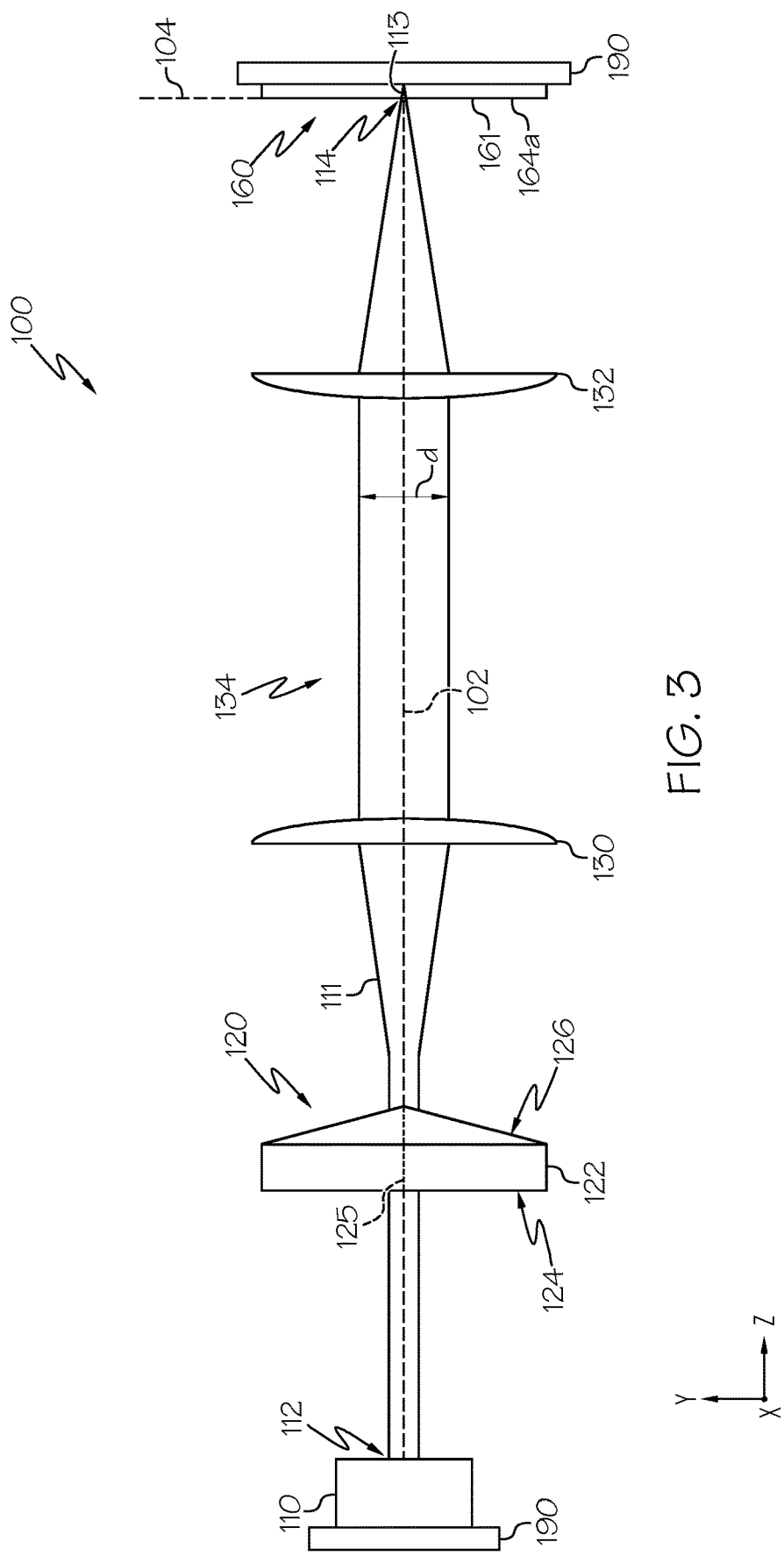
FIG. 3 schematically depicts an optical assembly for laser processing, according to one or more embodiments shown and described herein.

Referring now to FIG. 3, an optical assembly 100 for producing a pulsed laser beam 112 that is quasi-non-diffracting and forming the pulsed laser beam focal line 113 at the substrate stack 160 using the aspheric optical element 120 (e.g., an axicon 122) is schematically depicted. The optical assembly 100 includes a beam source 110 that outputs the pulsed laser beam 112, and a first and second lens 130, 132. However, the methods of laser processing described herein may be performed with other optical assemblies configured to direct a laser beam into the substrate stack 160.

The substrate stack 160 may be positioned such that the pulsed laser beam 112 output by the beam source 110 irradiates the substrate stack 160, for example, after traversing the aspheric optical element 120 and thereafter, both the first lens 130 and the second lens 132. An optical axis 102 extends between the beam source 110 and the one or more transparent workpieces 161 along the Z-axis such that when the beam source 110 outputs the pulsed laser beam 112, the beam pathway 111 of the pulsed laser beam 112 extends along the optical axis 102. As used herein, "upstream" and "downstream" refer to the relative position of two locations or components along the beam pathway 111 with respect to the beam source 110. For example, a first component is upstream from a second component if the pulsed laser beam 112 traverses the first component before traversing the second component. Further, a first component is downstream from a second component if the pulsed laser beam 112 traverses the second component before traversing the first component.

Still referring to FIG. 3, the beam source 110 may comprise any known or yet to be developed beam source 110 configured to output the pulsed laser beam 112. In operation, the defects 172 of the contour 170 (FIG. 1) are produced by interaction of the one or more transparent workpieces 161 with the pulsed laser beam 112 output by the beam source 110. In some embodiments, the beam source 110 may output a pulsed laser beam 112 comprising a wavelength of for example, 1064 nm, 1030 nm, 532 nm, 530 nm, 355 nm, 343 nm, 266 nm, or 215 nm. Further, the pulsed laser beam 112 used to form defects 172 in the one or more transparent workpieces 161 of the substrate stack 160 may be well suited for materials that are transparent to the selected pulsed laser wavelength.

Suitable laser wavelengths for forming defects 172 are wavelengths at which the combined losses of linear absorption and scattering by the one or more transparent workpieces 161 are sufficiently low. In embodiments, the combined losses due to linear absorption and scattering by the one or more transparent workpieces 161 at the wavelength are less than 20%/mm, or less than 15%/mm, or less than 10%/mm, or less than 5%/mm, or less than 1%/mm, where the dimension "/mm" means per millimeter of distance within the one or more transparent workpieces 161 in the beam propagation direction of the pulsed laser beam 112 (e.g., the Z direction). Representative wavelengths for many glass workpieces include fundamental and harmonic wavelengths of $Nd^{3+}$ (e.g. $Nd^{3+}$:YAG or $Nd^{3+}$:YVO$_4$ having a fundamental wavelength near 1064 nm and higher order harmonic wavelengths near 532 nm, 355 nm, and 266 nm). Other wavelengths in the ultraviolet, visible, and infrared portions of the spectrum that satisfy the combined linear absorption and scattering loss requirement for a given substrate material can also be used.

In operation, the pulsed laser beam 112 output by the beam source 110 may create multi-photon absorption (MPA) in the one or more transparent workpieces 161. MPA is the simultaneous absorption of two or more photons of identical or different frequencies that excites a molecule from one state (usually the ground state) to a higher energy electronic state (i.e., ionization). The energy difference between the involved lower and upper states of the molecule is equal to the sum of the energies of the involved photons. MPA, also called induced absorption, can be a second-order or third-order process (or higher order), for example, that is several orders of magnitude weaker than linear absorption. It differs from linear absorption in that the strength of second-order induced absorption may be proportional to the square of the light intensity, for example, and thus it is a nonlinear optical process.

The perforation step that creates the contour 170 (FIG. 1) may utilize the beam source 110 (e.g., an ultra-short pulse laser) in combination with optical components, such as the aspheric optical element 120, the first lens 130, and the second lens 132, to project the beam spot 114 on the substrate stack 160 (e.g., on the outward facing surface 164a of the first transparent workpiece 161a) and generate the pulsed laser beam focal line 113. The pulsed laser beam focal line 113 comprises a quasi-non-diffracting beam, such as a Gauss-Bessel beam or Bessel beam, as defined below, and may fully perforate the one or more transparent workpieces 161 to form defects 172 in the one or more transparent workpieces 161, which may form the contour 170. In some embodiments, the pulse duration of the individual pulses is in a range of from about 1 femtosecond to about 200 picoseconds, such as from about 1 picosecond to about 100 picoseconds, 5 picoseconds to about 20 picoseconds, or the like, and the repetition rate of the individual pulses may be in a range from about 1 kHz to 4 MHz, such as in a range from about 10 kHz to about 3 MHz, or from about 10 kHz to about 650 kHz.

As described herein, line length of the pulsed laser beam focal line 113 and numerical aperture of the pulsed laser beam 112 affect the amount of damage to the black matrix layer 163 during laser processing of the substrate stack 160. Several methods are available to adjust each of the line length and numerical aperture to achieve the desired line length and numerical aperture. When using an axicon 122 to form a quasi-non-diffracting beam, the line length of the pulsed laser beam focal line 113 is proportional to the diameter of the pulsed laser beam 112 incident upon the axicon 122, therefore adjusting the diameter may directly adjust the line length. In some embodiments, an input pulsed laser beam 112 diameter d may be adjusted using telescoping lenses (not shown) positioned along the beam pathway 111 between the beam source 110 and the substrate stack 160. The pulsed laser beam 112 may pass through an aspheric optical element 120, such as an axicon 122 before or after the diameter of the pulsed laser beam 112 is adjusted. In some embodiments, the aspheric optical element 120 may function as the focusing optic in the beam pathway 111 before the pulsed laser beam 112 impinges the substrate stack 160.

Figure 4A:
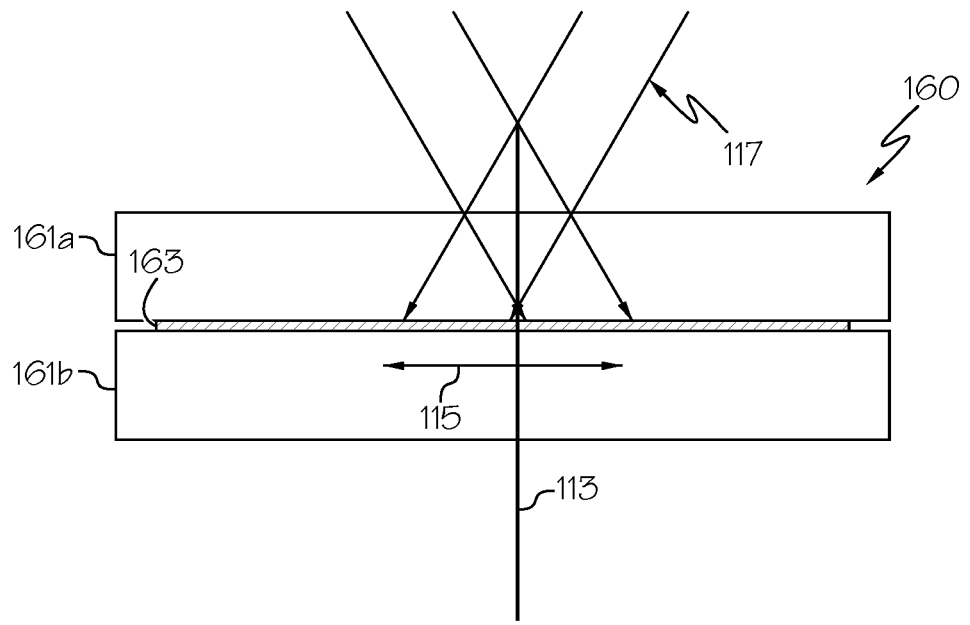
FIG. 4A schematically depicts a first source of damage to the black matrix layer, according to one or more embodiments shown and described herein.
Figure 4B:
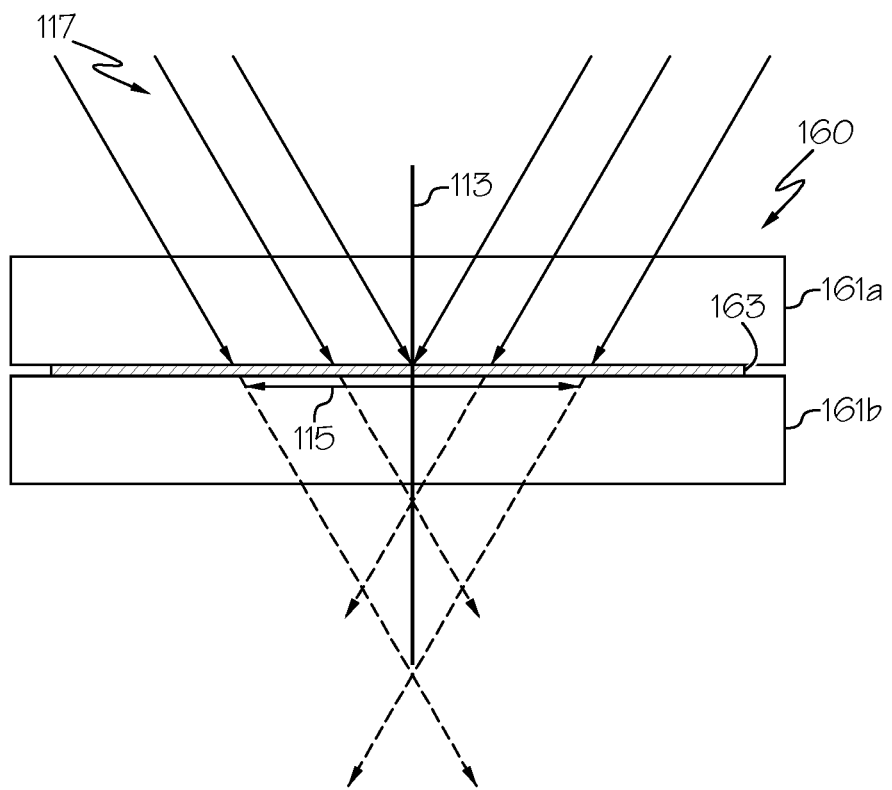
FIG. 4B schematically depicts a second source of damage to the black matrix layer, according to one or more embodiments shown and described herein.

Referring now to FIGS. 4A-4B, sources of damage to the black matrix layer 163 are depicted. Damage to the black matrix layer 163 (or other interlayers) may arise from two sources. The first source is from the light rays 117 (energy) of the pulsed laser beam 112 that focuses into the portion of the pulsed laser beam focal line 113 that lies above the black matrix layer 163 as shown in FIG. 4A. A second source of damage to the black matrix layer 163 may result from the light rays 117 (energy) from the pulsed laser beam 112 that focuses into the portion of the pulsed laser beam focal line 113 that lies below the black matrix layer 163 as shown in FIG. 4B. A damage area 115 is defined as the area 115 that the light rays 117 from the pulsed laser beam 112 intersect the black matrix layer 163. In response to discovering the sources of damage to the black matrix layer 163, it was determined, as described in more detail herein, that by controlling the line length of the pulsed laser beam focal line 113, the numerical aperture, the structure of one or more apertures along the beam pathway 111, or a combination thereof, the damage area 115 to the black matrix layer 163 may be reduced or prevented.

In general, the quasi-non-diffracting beam length, or pulsed laser beam focal line length, L, is evaluated in a vacuum or air, where the index of refraction is either equal to 1 or very close to 1 (e.g., air, n=1.0003). However, if the medium through which the light rays 117 pass has an index of refraction not equal to 1, then the region over which the pulsed laser beam focal line extends is effectively lengthened by $t*(n-1)$, where n is the index of refraction of the medium, and t is the thickness of that medium. Hence, an effective focal line length L' may be defined as equal to the pulsed laser beam focal line length L measured in air (or vacuum), plus $\Sigma_i(t_i*(n_i-1))$, where the summation is performed over each medium i over which the pulsed laser beam focal line extends. For example, if a pulsed laser beam focal line has a length L in air of 1 mm, but is placed such that it extends through a 0.5 mm thickness of glass with an index n=1.5, then the effective focal line length L' will be 1.0 mm+0.5*(1.5-1)=1.25 mm.

Figure 5B:
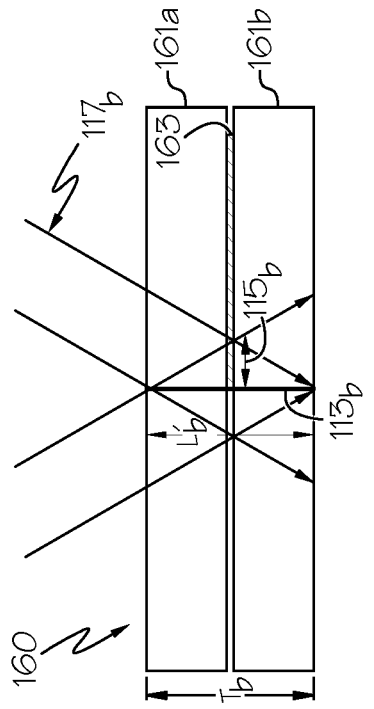
FIG. 5B schematically depicts a reduced pulsed laser beam focal line length, according to one or more embodiments shown and described herein.
Figure 5D:
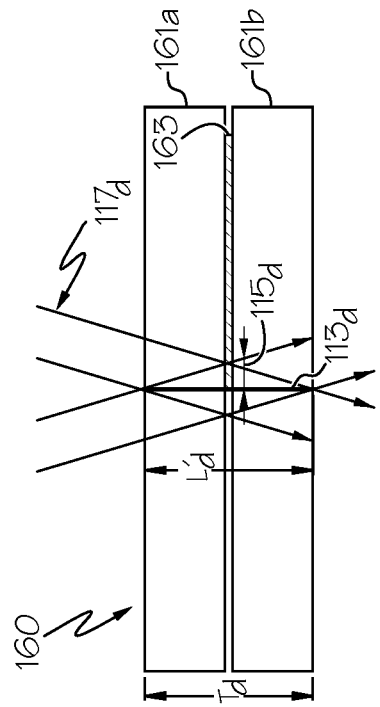
FIG. 5D schematically depicts a combination of a reduced pulsed laser beam focal line length and a reduced numerical aperture for a pulsed laser beam, according to one or more embodiments shown and described herein.
Figure 5A:
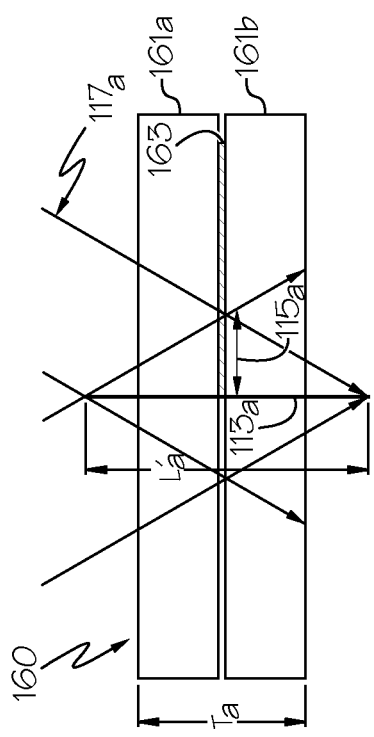
FIG. 5A schematically depicts an uncontrolled pulsed laser beam focal line resulting in damage to the black matrix layer, according to one or more embodiments shown and described herein.

Referring to FIGS. 5A-5E, diagrams depict the effects of the effective focal line length L' of the pulsed laser beam focal line 113, the numerical aperture and a combination thereof on the amount of damage caused to the black matrix layer 163. FIG. 5A depicts a diagram where neither the effective focal line length L' nor the numerical aperture of the pulsed laser beam 112 are controlled. As discussed above, to maximize glass sheet percent utilization, laser processing should occur very close to the black matrix layer 163. Typically, the black matrix layer 163 is laterally displaced to one side of the intended cut. The opposing side or interlayer adjacent the black matrix layer 163 (e.g., the portion between the one or more transparent workpieces 161 which does not include a black matrix layer 163) may comprise a resin bonding the one or more transparent workpieces 161. In some embodiments, the portion of the interlayer adjacent the black matrix layer 163 of the substrate stack 160 may have air gaps in various locations. According to another embodiment, ductile layers such as adhesives may be disposed between the one or more transparent workpieces 161. However, the pulsed laser process described herein will still, in a single pass, fully perforate both the upper and lower glass layers of such a stack.

As shown in FIGS. 5A-5E, the black matrix layer 163 is located to the right of the pulsed laser beam focal line 113 and the intended cut is adjacent thereto (i.e., the intended cut is co-located with the pulsed laser beam focal line 113). Viewing FIGS. 5A and 5B, the effective focal line length L'a of the pulsed laser beam focal line 113a is reduced as initially shown in FIG. 5A to the effective focal line length L'b of the pulsed laser beam focal line 113b as shown in FIG. 5B. Reducing the effective focal line length L'a of the pulsed laser beam focal line 113a concentrates the energy delivered by the pulsed laser beam 112. For example, as shown in FIG. 5A the light rays 117a (i.e., energy) from the pulsed laser beam 112 generate a portion of the pulsed laser beam focal line 113a that lies above the outward facing surface 164a (e.g., the target surface as shown in FIG. 1) of the substrate stack 160 and a portion of the pulsed laser beam focal line 113a that lies below the substrate stack 160. In FIG. 5B the light rays 117b (i.e., energy) from the pulsed laser beam 112 generate pulsed laser beam focal line 113b where the effective focal line length L'b is equal to Tb, the thickness of the substrate stack 160. In some embodiments, the pulsed laser beam focal line 113b is equal to the thickness of the substrate stack 160 plus a small additional tolerance X (not shown) on each side of the substrate stack 160. By viewing FIGS. 5A and 5B, it is shown that by reducing the effective focal line length from L'a to L'b the amount of impingement of the black matrix area 115a to 115b by the light rays 117a to 117b is reduced. In some embodiments, the reduction is accomplished by adjusting the diameter of the pulse laser beam incident on a focusing optic, e.g. second lens 132, positioned in the beam pathway 111 (FIG. 3) between the beam source 110 and the substrate stack 160. However, this is only one method described herein for controlling the line length L (and subsequently the effective focal line length L') of the pulsed laser beam focal line 113.

In some embodiments, the effective focal line length L' may be greater than the thickness T of the substrate stack 160 by about 20% or less. For example, if the substrate stack 160 is 1 mm, then the effective focal line length L' may be about 1.2 mm or less. In other embodiments, the effective focal line length L' may be greater than the thickness of the substrate stack 160 by about 15% or less, or by about 10% or less. In some embodiments, the effective focal line length L' of the pulsed laser beam focal line 113 is configured to be positioned evenly about the midpoint of the thickness T of the substrate stack 160. In some embodiments, the effective focal line length L' may extend beyond the thickness of the substrate stack 160 in order to account for variations in the thickness T of the substrate stack 160 and/or tolerances associated with the laser processing equipment. In yet other embodiments, the effective focal line length L' may be greater than about 10% or less the thickness of the substrate stack 160 or the effective focal line length may less than the thickness of the substrate stack 160.

Figure 5C:
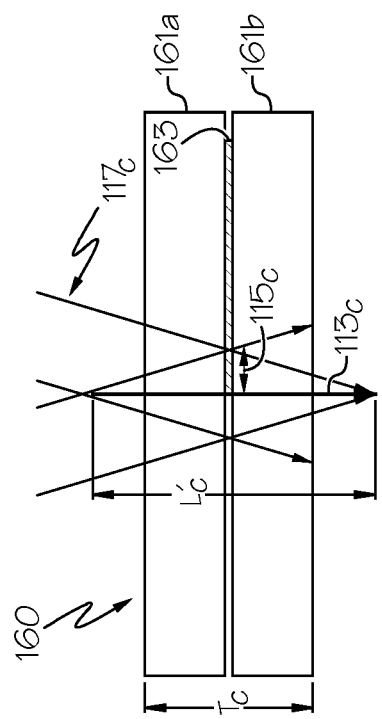
FIG. 5C schematically depicts a reduced numerical aperture for a pulsed laser beam focal line, according to one or more embodiments shown and described herein.

Referring now to FIG. 5C, the effect of adjusting the numerical aperture while maintaining the effective focal line length L' is depicted. For a fixed effective focal line length L', it was discovered that reducing the numerical aperture, i.e., the angle of the incoming light rays 117c (i.e., energy) from the pulsed laser beam 112, may also reduce the damage area 115c of the black matrix layer 163. That is, the incoming light rays 117c from the pulsed laser beam 112 interacts/passes through a smaller area 115c of the black matrix layer 163 than incoming light rays 117a (shown in FIG. 5A) which produce damage area 115a which is larger than 115c. In some embodiments, by decreasing the cone angle of the light rays 117c from the pulsed laser beam 112 (as compared to the cone angles illustrated by light rays 117a and 117b shown in FIGS. 5A and 5B), the region of the black matrix layer 163 struck by the cone of light will be smaller and thereby minimize damage area 115 that may be incurred by the black matrix layer 163.

Referring now to FIG. 5D, combining a reduced effective focal line length L'd and a reduced numerical aperture may further reduce the undesirable effects, i.e., damage, to the black matrix layer 163. By comparing the damage area 115a depicted in FIG. 5A with the damage area 115d in FIG. 5D, it is observable that a combination of reducing the effective focal line length L'd of the pulsed laser beam focal line 113d and the numerical aperture, i.e., the angle of incoming light rays 117d from the pulsed laser beam 112, reduces the damage area 115d of the black matrix layer 163 as shown in FIG. 5D. However, for the pulsed laser beam 112 to effectively produce a defect within the one or more transparent workpieces 161 the numerical aperture should be greater than about 0.01 for a wavelength of 1064 nm. In some embodiments, the numerical aperture is a function of the wavelength of the pulsed laser beam 112. The relationship between the numerical aperture and wavelength may be expressed by the formula $$d = k * \frac{\lambda}{NA},$$

where d is the diameter of the pulsed laser beam focal line 113 (or spot size) (e.g., a quasi-non-diffracting beam), $\lambda$ is the wavelength, NA is the numerical aperture and k is a constant. The constant is equal to about 0.76 for an ideal Gauss-Bessel beam. However, the exact value for k will vary for different variants of the quasi-non-diffracting beams, but is generally close to 1. Therefore, the proportional change in wavelength generally corresponds directly to a proportional change in NA. It is also noted that a more precise formula for spot diameter of a Gauss-Bessel beam may be used which is expressed by the equation:

$$d = 2\frac{2.405\lambda_0}{NA} \frac{1}{2\pi n_0},$$

where d is the diameter of the quasi-non-diffracting beam (or focal line), $\lambda$ is the wavelength and NA is the numerical aperture.

In some embodiments, the numerical aperture for a wavelength of 1064 nm may be from about 0.1 to about 0.5. Optionally, the numerical aperture is from about 0.15 to about 0.4, or from about 0.2 to about 0.4, or from about 0.2 to about 0.35, or from about 0.1 to about 0.2. Optionally, the numerical aperture is about 0.37, 0.275 or 0.22 for a wavelength of about 1064 nm. As discussed above, the numerical aperture may be decreased by one-half if, for example, the wavelength is changed from 1064 nm to 532 nm. Other wavelengths may include 355 nm or 266 nm or other common harmonics of a 1064 nm laser. Configuring the numerical aperture to achieve a desired value is discussed in more detail below.

Referring now to FIG. 5E, in some embodiments, the edge 163a of the black matrix layer 163 is offset from the intended cut location (depicted as co-located with the pulsed laser beam focal line 113e, which may also refer to the center of the pulsed laser beam focal line). This offset may reduce or eliminate the damage area 115e of the black matrix layer 163 since the center of the pulsed laser beam focal line 113e is offset a distance 119 from the edge 163a of the black matrix layer 163. That is, in some embodiments, a portion of the pulsed laser beam 112 that forms the pulsed laser beam focal line 113e does not impinge the black matrix layer 163. The distance 119 defining the offset of the center of the pulsed laser beam focal line 113e from the edge 163a of the black matrix layer 163 may be controlled and reduced by implementing a laser cutting process where the pulsed laser beam focal line 113 includes an effective focal line length $L_e$' within X % of the total thickness $T_e$ of the substrate stack 160 and a low NA such that the pulsed laser beam 112 still induces non-linear optical effects (e.g., multi-photon absorption) in the transparent workpiece while minimizing damage to the black matrix layer 163. As briefly stated above, the NA and the effective focal line L' effect the distance 119 at which the center of the laser beam may be offset from the edge 163a of the black matrix layer 163.

For example, given a substrate having a total thickness $T_e$ of 1 mm and the effective focal line length $L_e$' of the pulsed laser beam focal line 113 is 1.2 mm (i.e., the effective focal line length $L_e$' is 20% greater than the total thickness $T_e$) then the center of the pulsed laser beam focal line may be offset from the edge 163a of the black matrix layer 163 by a distance of 20% or less of the total thickness $T_e$ of the substrate stack. By way of another example, given a substrate stack 160 having a total thickness $T_e$ of 1 mm and the effective focal line length $L_e$' of the pulsed laser beam focal line 113 is 1.15 mm (i.e., the effective focal line length $L_e$' is 15% greater than the total thickness $T_e$) then the center of the pulsed laser beam focal line 113 may be offset from the edge 163a of the black matrix layer 163 by a distance of 15% or less of the total thickness $T_e$ of the substrate stack 160. Furthermore, as another example, given a substrate stack 160 having a total thickness $T_e$ of 1 mm and the effective focal line length $L_e$' of the pulsed laser beam focal line 113 is 1.1 mm (i.e., the effective focal line length $L_e$' is 10% greater than the total thickness $T_e$) then the center of the pulsed laser beam focal line 113 may be offset from the edge 163a of the black matrix layer 163 by a distance of 10% or less of the total thickness $T_e$ of the substrate stack 160. In some embodiments, the NA may further reduce the distance at which the center of the pulsed laser beam focal line 113 may be offset from the edge 163a of the black matrix layer 163. As a result, by offsetting the pulsed laser beam focal line 113 a distance 119 from the edge 163a of the black matrix layer 163 may even further reduce the amount of damage area 115e of the black matrix layer 163.

In some embodiments, a focus offset is another consideration that was discovered to be a factor in minimizing the damage area 115 of the black matrix layer 163. As used herein, "focus offset" refers to the vertical distance from the center of the line length L of the pulsed laser beam focal line to the black matrix layer 163. As used herein, "vertical" refers to the Z-axis, which is oriented in the beam propagation direction. For example, given a substrate stack 160 having the following structure: 0.5 mm Eagle XG® (EXG)/ black matrix layer 163 (BM)/0.5 EXG and the pulsed laser beam focal line 113 has a line length L of 1.1 mm, then a focus offset of zero would result in 0.55 mm of the line length L above the black matrix layer 163 and 0.55 mm of the line length L below the black matrix layer 163, before considering an increase in length of the line length as a result of refraction, if any. For the same structure, but now with a focus offset of +0.1 mm, the line length L above the black matrix layer 163 would be 0.65 mm and the line length L below the black matrix layer 163 would be 0.45 mm. In some embodiments, such as in the previous example, the line length L of the pulsed laser beam focal line 113 may not traverse the entire thickness of the substrate stack 160. That is, the pulsed laser beam focal line 113 does not extend through the entire thickness of the substrate stack 160. In such instances, the pulsed laser beam focal line 113 extends through a portion of the thickness of the substrate stack 160.

Figure 6:
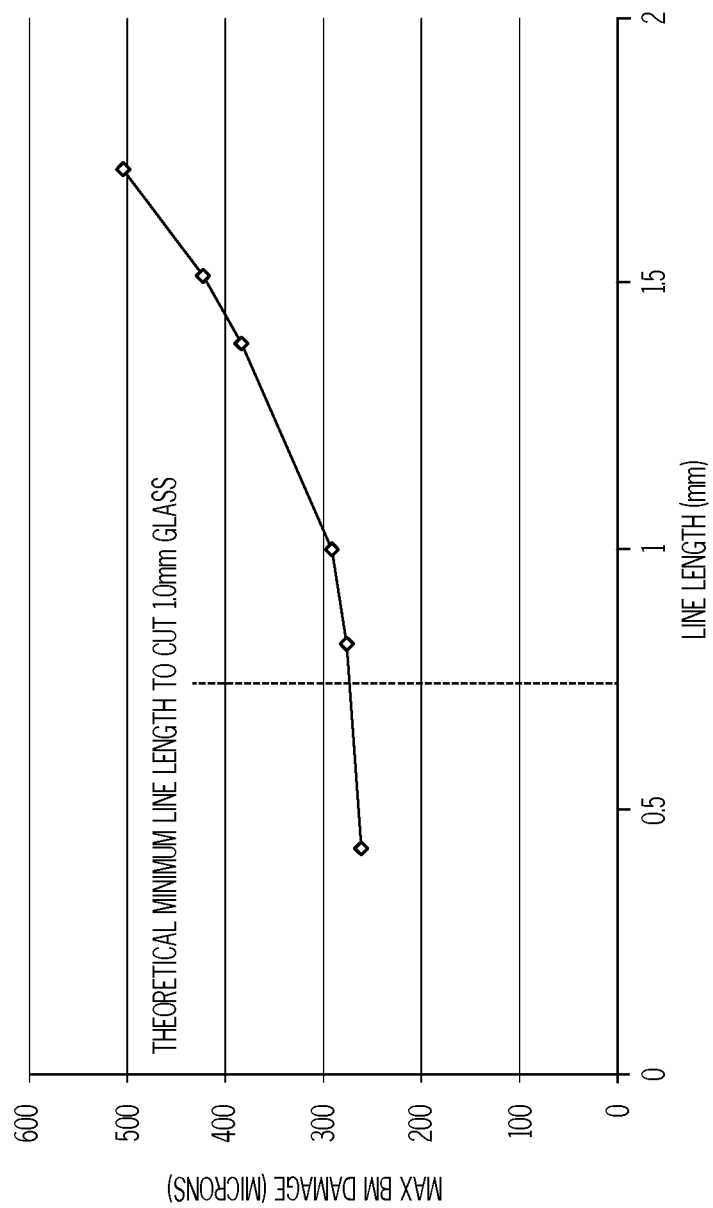
FIG. 6 graphically depicts the measured maximum black matrix layer damage as a function of line length, according to one or more embodiments shown and described herein.

Referring to FIG. 6, an experimentally measured amount of the damage to the black matrix layer 163 as a function of the pulsed laser beam focal line length is graphically shown. As the line length decreases, the maximum black matrix layer 163 damage decreases. Additionally, the vertical dashed line represents a theoretical minimum line length to cut a 1.0 mm substrate stack 160, for which it again should be noted that the line length can be shorter than the glass thickness since the presence of the glass (n=1.5) will effectively lengthen the pulsed laser beam focal line length by a factor of 1.5.

Figure 7A:
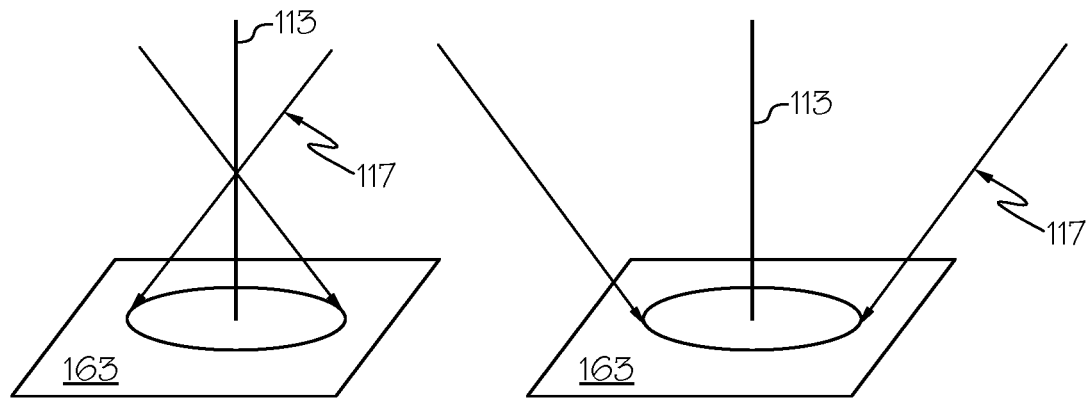
FIG. 7A schematically depicts how light rays that focus into the pulsed laser beam focal line above (left) and below (right) the black matrix layer interact with the black matrix layer, according to one or more embodiments shown and described herein.
Figure 7B:
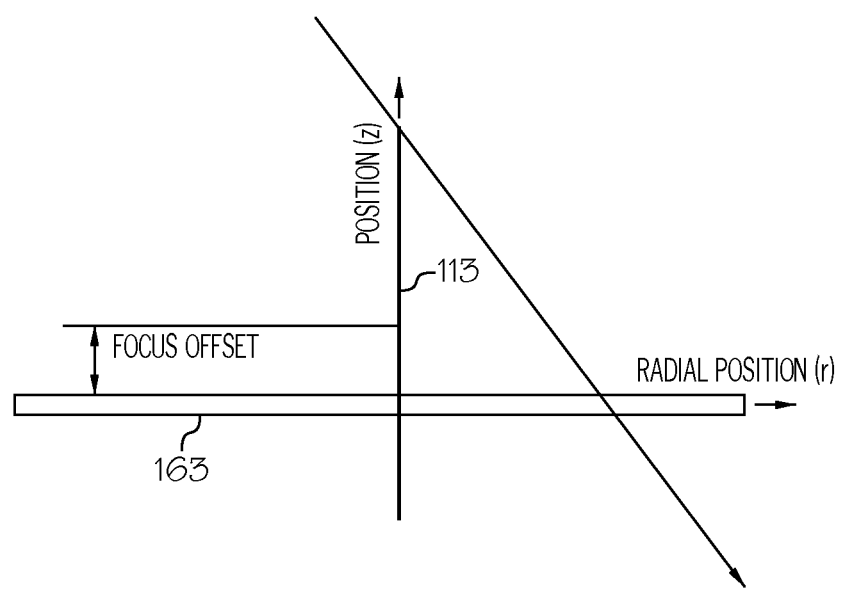
FIG. 7B schematically depicts how a light ray at the top of the pulsed laser beam focal line interacts with the black matrix layer, according to one or more embodiments shown and described herein.

Referring to FIG. 7A, a schematic diagram showing how the light rays 117, which focus into a pulsed laser beam focal line 113 above (left figure) and below (right figure) the black matrix layer 163, interact with the black matrix layer 163. Although the light rays 117 shown depict only two rays apiece, these light rays 117 represent the full cone of light focused by a focusing optic, e.g. a second lens 132 (FIG. 3), in the beam path of the pulsed laser beam 112 to form the pulsed laser beam focal line 113. The angle of the light rays 117 incident on the target surface of the transparent workpiece (not shown) and subsequently the black matrix layer 163 is determined by the focal length and half the input beam diameter, which is referred to as numerical aperture. FIG. 7B schematically depicts an even further simplification of how a single light ray at the top of the pulsed laser beam focal line 113 interacts with the black matrix layer 163. The following further describes the necessary variables for configuring the numerical aperture and line length to reduce undesirable effects to the black matrix layer 163.

The numerical aperture (NA) is related to the beam diameter (d) incident on a focusing lens and the lens focal length (f) by Equation (1).

$$NA = \frac{d}{2f} \quad (1)$$

Using the law of triangles, the ratio of the radial position (r) to the Z position (z) is equal to the ratio of the beam diameter and focal length, as shown in Equation (2):

$$\frac{r}{z} = \frac{d}{2f} = NA \quad (2)$$

Rearranging Equation (2) gives:

$$r = NA*z \quad (3)$$

The energy density in the line focus itself is a function of Z. While the energy distribution of a quasi-non-diffracting beam along the beam propagation direction can take many forms, one of the most common is a Gauss-Bessel distribution. For modeling simplicity, a normalized top hat function (magnitude=1) will be used. The impact of other distributions will be discussed below. The energy density along the optical axis 102 of such a top-hat energy distribution E(z) can be expressed as:

$$z < z_{start} E(z) = 0$$

$$z_{end} < z < z_{start} E(z) = 1$$

$$z > z_{end} E(z) = 0 \quad (4)$$

Here $z_{start}$ and $z_{end}$ are the start and end the line focus. The line length is defined as the difference of $z_{start}$ and $z_{end}$.

The rays that form the pulsed laser beam focal line at each Z position map linearly to a radius where the same rays will intercept the black matrix layer 163. Thus, the energy from a given Z location in the pulsed laser beam focal line will later intercept the black matrix layer 163, and that energy will be distributed around the circumference of a circle of radius r. The circumference can be written using Equation (3) above as:

$$C = \pi d = 2\pi r = 2\pi * NA * z \quad (5)$$

Thus, in the plane of the black matrix material, the energy impinging on an annulus of radius r from the pulsed laser beam focal line position E(r), can be expressed as:

$$E(r) = \frac{E(z)}{C} = \frac{E(z)}{2\pi * r} = \frac{E(z)}{2\pi * NA * z} \quad (6)$$

Care must be taken to include contributions from the portions of the pulsed laser beam focal line both above and below the BM. For modeling convenience, the location of the black matrix layer 163 is assumed to be Z=0. From this equation, it is apparent that the energy density in the black matrix plane is a function of the NA of the beam. It can also be seen that the energy density will tend to fall off as 1/r, where r is the radial distance from the pulsed laser beam focal line. Finally, the total amount of energy E(r) in a given annulus of radius r will also be determined by the length and energy distribution of the focal line, which is encoded as the distribution E(z)/z.

Figure 10:
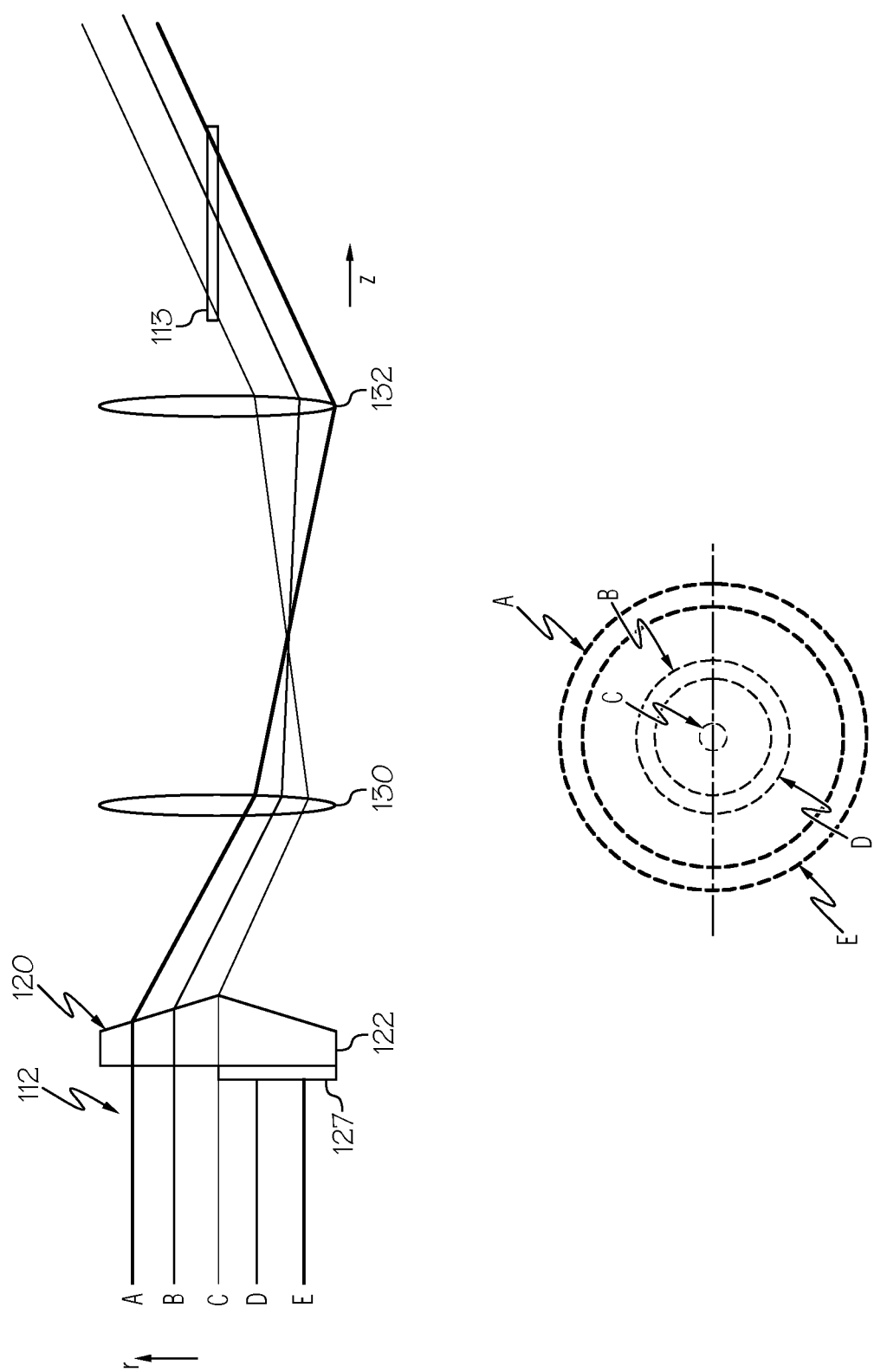
FIG. 10 schematically depicts a mapping of input rays to locations along the pulsed laser beam focal line, according to one or more embodiments shown and described herein.

In other embodiments, a method referred to as vignetting may be implemented to control the pulsed laser beam focal line length. In the optical system of FIG. 3, the axicon 122 maps input beam rays at specific distances from the optical axis 102 to specific Z-axis crossing points in the focal line. Use of an aperture such as an iris or diaphragm, allows one to cut off the light rays that strike the axicon 122 at a larger radius, while allowing the innermost light rays to pass. In the system shown in FIG. 10, the outer radius light rays A striking the axicon 122 are mapped to the tail or distal end of the pulsed laser beam focal line 113, while the innermost light rays C are mapped to the front or portion of the pulsed laser beam focal line 113 that is closest to the optics. In FIG. 10, a mapping of input rays to the pulsed laser beam focal line locations is depicted. An aperture 127 is used to block half of the incoming light (i.e., light rays D and E) in order to show the propagation path of the inner light rays C and the out light rays A. Although, a modified aperture may operate to block or limit other portions of the incoming light rays to affect variations on the pulsed laser beam focal line 113. For example, in some embodiments, an aperture 127 such as an iris may be introduced to vignette the outermost rays, thereby effectively cutting off the tail of the focal line. This reduces the optical energy of the light rays 117 focused below the substrate stack 160 that would potentially impinge and increase the damage area 115 of the black matrix layer 163. The size of the aperture 127 for vignetting may be adjusted to change the line length L of the pulsed laser beam focal line 113. However, vignetting may reduce the amount of energy in the system because some energy is blocked. As such, a higher power laser beam source 110 may be used to compensate.

Figure 8A:
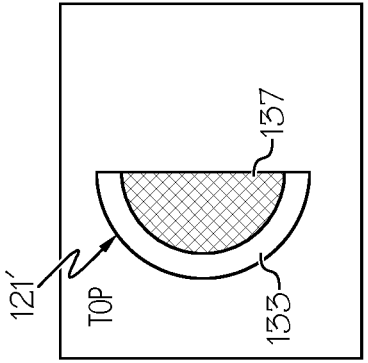
FIG. 8A schematically depicts a top view of an aperture where only light rays on the right half circle are allowed to pass through the aperture, according to one or more embodiments shown and described herein.
Figure 8B:
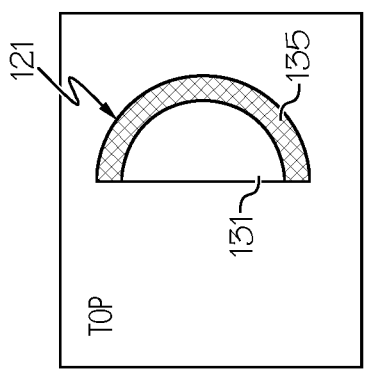
FIG. 8B schematically depicts a top view of an aperture where only light rays on the left half circle are allowed to pass through the aperture, according to one or more embodiments shown and described herein.
Figure 8C:
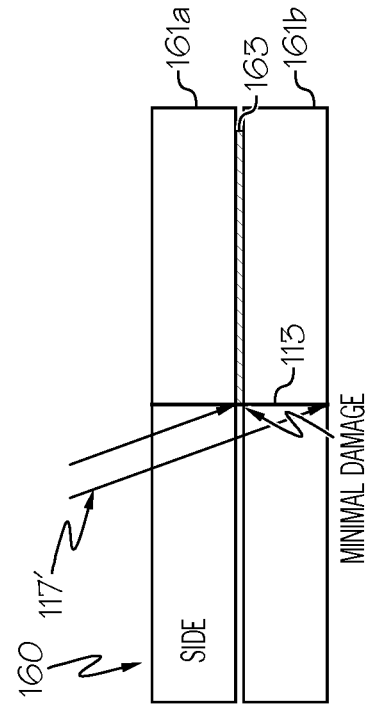
FIG. 8C schematically depicts the resulting light ray pattern after passing through the aperture depicted in FIG. 8A, according to one or more embodiments shown and described herein.
Figure 8D:
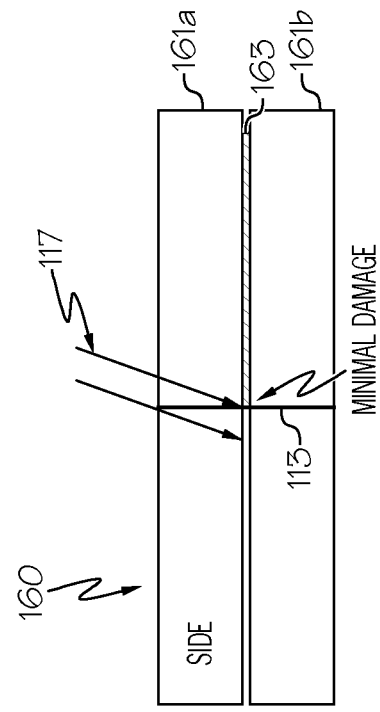
FIG. 8D schematically depicts the resulting light ray pattern after passing through the aperture depicted in FIG. 8B, according to one or more embodiments shown and described herein.
Figure 9:
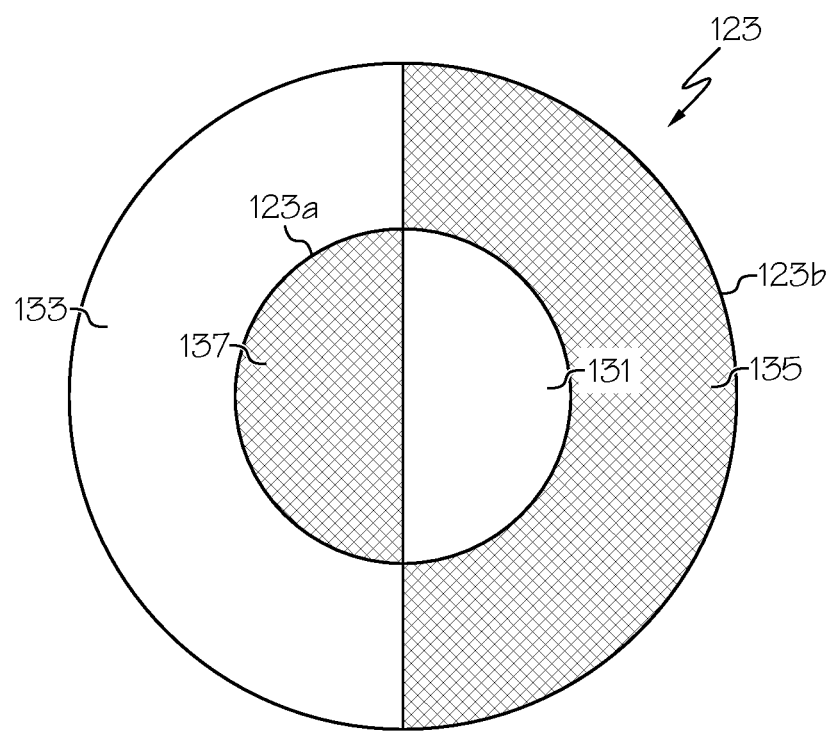
FIG. 9 schematically depicts a top view of a modified aperture, according to one or more embodiments shown and described herein.

Referring now to FIGS. 8A-9, damage to the black matrix layer 163 may be reduced by introducing a modified aperture 123 (as shown in FIG. 9) upstream from the axicon 122 in the beam pathway 111 of the optical assembly 100 (as shown in FIG. 3) which extends from the beam source 110 to the substrate stack 160. As used herein, "upstream" and "downstream" refer to the relative position of two locations or components along the beam pathway 111 with respect to the beam source 110. In some embodiments, the modified aperture 123 and the focusing optic, e.g. second lens 132, are formed as a single optical component in the beam pathway 111. Referring to FIGS. 8A-8B, two halves 121, 121' of an example modified aperture 123 (FIG. 9) are shown. Additionally, a schematic representation of the effect of the light rays 117 from the pulsed laser beam 112, which pass through open aperture portions of the modified aperture 123 on the black matrix layer 163 are shown in FIGS. 8C and 8D, respectively. FIG. 8A depicts a top view of a first half 121 of a modified aperture 123 where light rays 117 incident on the first half 121 of a modified aperture 123 pass through an inner open portion 131 and are blocked by an outer closed portion 135 such that the light rays 117 avoid or only minimally impinge the black matrix layer 163 as shown in FIG. 8C.

FIG. 8B depicts a top view of a second half 121' of a modified aperture 123 where light rays 117' incident on the second half 121' of a modified aperture 123 pass through an outer open portion 133 and are blocked by an inner closed portion 137 such that the light rays 117' avoid or only minimally impinge the black matrix layer 163 as shown in FIG. 8D. Effectively the modified aperture 123 spatially modifies the incoming beam so that the light rays 117 that focus on the first transparent workpiece 161a of the substrate stack 160 only come from the first half 121 of the modified aperture 123 which is closest to the black matrix layer 163 and the light rays 117' that focus on second transparent workpiece 161b of the substrate stack 160 only come from the second half 121' of the modified aperture 123. Here, the two halves 121, 121' of the modified aperture 123 remove light rays 117 that would impinge the black matrix layer 163. This results in a minimization of damage to the black matrix layer 163. While half circle apertures are provided as an example, other shapes may be implemented in the modified aperture 123 to selectively block and pass portions of the light rays 117 from the pulse laser beam. Thus, in operation, the step of forming the contour 170 in the one or more transparent workpieces 161 of the substrate stack 160 comprises modifying a pulsed laser beam 112 oriented along a beam pathway 111 and output by a beam source 110 with a modified aperture 123, which blocks a portion of the pulsed laser beam 112 in optical alignment with the black matrix layer 163. As used herein, a component is in "optical alignment" with the pulsed laser beam 112 when the pulsed laser beam 112 propagating along a beam pathway 111 would impinge the component if not blocked or absorbed by an intervening component.

Referring now to FIG. 9, the modified aperture 123 resulting from a combination of the first half 121 and the second half 121' of the modified aperture 123 shown and described with reference to FIGS. 8A-8B is depicted. The modified aperture 123 may include an inner annulus 123a and an outer annulus 123b. The inner annulus 123a comprises an inner open portion 131 to pass light rays 117 from the pulsed laser beam 112 and an inner closed portion 137 to block light rays 117 from the pulsed laser beam 112 such that light rays 117 passed by the inner annulus 123a impinge the substrate stack 160 without impinging the black matrix layer 163 or minimally impinging the black matrix layer 163. Additionally, the outer annulus 123b comprises an outer open portion 133 to pass light rays 117 from the pulsed laser beam 112 and an outer closed portion 135 to block light rays 117 from the pulsed laser beam 112, such that light rays 117 passed by the outer annulus 123b impinge the substrate stack 160 but not the black matrix layer 163.

In some embodiments, the modified aperture 123 may shape the pulsed laser beam 112 by truncating a portion, e.g., half, of the outer light rays and the opposite inner light rays. The light rays 117 that pass through the inner annulus 123a can be used to from defects 172 in the first transparent workpiece 161a, e.g., the upper piece of glass in the substrate stack 160. Furthermore, after the light rays 117 focus along the pulsed laser beam focal line 113 they will continue through an uncoated portion of the interlayer (i.e. the portion of the interlayer not coated by black matrix material) and not through the black matrix layer 163. Conversely, the light rays 117' that pass through the outer annulus 123b may be used to from defects 172 in the second transparent workpiece 161b, e.g., the lower piece of glass in the substrate stack 160. After the light rays 117' passing through the outer annulus 123b focus along the pulsed laser beam focal line 113 they may minimally impinge or do not impinge the black matrix layer 163 since all or most of these light rays 117 focus into the pulsed laser beam focal line 113 below the black matrix layer 163. This is but one-way to shape the beam to achieve the desired minimization of damage to the black matrix layer 163. Other modified aperture configurations may be configured to block and pass portions of the light rays 117 to reduce damage to the black matrix layer 163.

Figure 11:
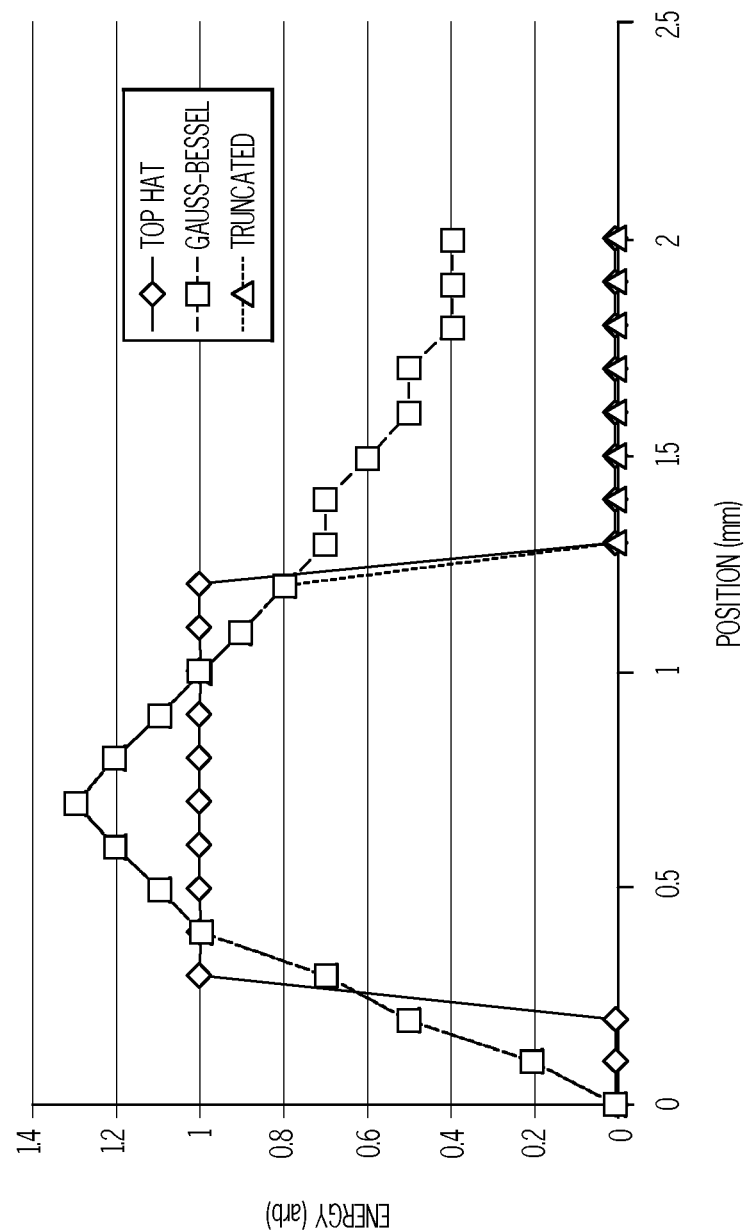
FIG. 11 graphically depicts different energy distributions including top-hat, Gauss-Bessel and truncated Gauss-Bessel, according to one or more embodiments shown and described herein.

When a laser that emits a Gaussian shaped beam is used as the input to the optical system depicted in FIG. 3, this creates a quasi-non-diffracting beam known as a Gauss-Bessel beam. The peak cross-sectional intensity of this beam as a function of distance along the optical propagation direction is depicted in FIG. 11. FIG. 11 graphically depicts different energy distributions including top-hat, Gauss-Bessel and truncated Gauss-Bessel. As shown, the top-hat distribution reduces the amount of energy that is not used for cutting and may otherwise damage the black matrix layer 163. The damaging portion of the distribution can be seen at greater than 1.3 mm. In contrast to a more commonly known Gauss-Bessel beam, in some embodiments, custom designed optics may be implemented in the beam pathway 111, such as ones that create a top-hat energy distribution as measured as a function of distance along the optical axis 102. A top-hat energy distribution confines the line focus energy to a smaller region along the optical axis 102, effectively meaning there is less energy in the light rays 117 of the pulsed laser beam 112 that focus above/below the substrate stack 160. Truncating the traditional Gauss-Bessel beam also reduces the damage to the black matrix layer 163, but only on one side and hence is not as preferable as the top-hat energy distribution. The top-hat energy distribution may extend through the entire thickness of the substrate stack 160, but optionally no more than 200 microns above and below the substrate stack 160, as measured in air. As discussed above, the energy focused above/below the substrate stack 160 and its associated light rays 117 do not benefit the laser cutting process, those rays rather serve to damage the black matrix layer 163 at increasing radial distances from the contour 170. A standard Gauss-Bessel beam has energy in the tails of the beam, which may lead to damage to the black matrix layer 163 without benefiting the cutting process. Using optics to create this top-hat energy distribution also reduces the amount of energy lost as compared reducing the pulsed laser beam focal line length by using a vignetting method. However, optics that create such a top-hat energy distribution can be more complex to make and customized to a particular line length, which makes them less flexible if cutting different substrate stack 160 thicknesses is desired.

The creation of a top-hat energy distribution for a quasi-non-diffracting beam may be accomplish by replacing the axicon with an optic or series of optics that distributes the energy of a Gaussian beam into an energy profile that populates each annular ring of the beam with an equal energy. Since the optics similar to those shown in FIG. 3 ultimately map an annulus of a given radius to a unique axial (focus) location in the focal line, by populating each annular region of the beam with equal energy the final pulsed laser beam focal line will have uniform energy density along its length. However, such "top hat" energy profile generating optics may have other surface profiles as well. An optical mapping strategy and optical design to create quasi-non-diffracting beams having a "top hat" energy profile is described in more detail in PCT/US17/49030, "Laser Cutting of Materials with Intensity Mapping Optical System," which is incorporated herein by reference.

Figure 12:
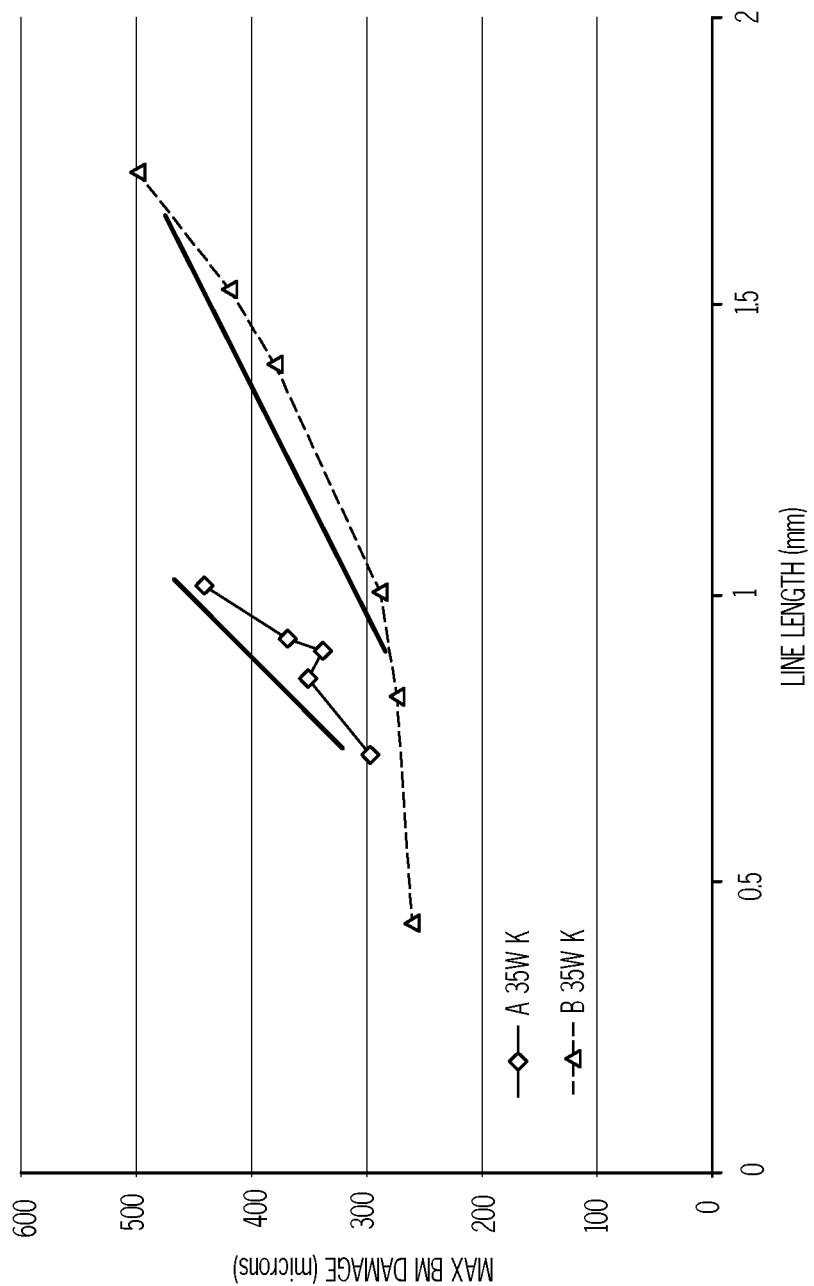
FIG. 12 graphically depicts experimental data of the black matrix damage as a function of line length for two different numerical aperture (NA) values, according to one or more embodiments shown and described herein.

FIG. 12 graphically depicts experimental measurements of damage to the black matrix layer 163 in the lateral direction (X-Y plane, FIG. 1) as a function of line length for two different NA values. (A is higher NA~0.37 and B is a lower NA~0.28). While the total laser energy within the pulsed laser beam focal line was held constant in this experiment, both the slopes and absolute magnitudes of damage shown are clearly different. For longer pulsed laser beam focal line lengths, the lateral extent of the black matrix damage grows. For the small NA, the lateral extent of the black matrix damage is less than for the higher NA. It is evident that to minimize the lateral extent of the black matrix damage, one would seek to use a line length just long enough to nano-perforate fully through the glass stack, but with as low a NA as possible while still providing a pulsed laser beam focal line diameter with energy density great enough to damage the glass.

While the terms Bessel beam and Gauss-Bessel beam are commonly used in the literature, they are only specific case of quasi-non-diffracting beams, and depending on the optical system used are not always accurate descriptors of the actual optical beams employed in laser cutting systems. It is therefore useful to consider what properties define a quasi-non-diffracting beam, as well as what defines its length.

Referring again to FIGS. 1 and 2, the pulsed laser beam 112 used to form the defects 172 in the one or more transparent workpieces 161 further has an intensity distribution I(X,Y,Z), where Z is axis along which the beam propagation direction of the pulsed laser beam 112 follows, and X and Y are directions orthogonal to the direction of propagation, as depicted in the figures. The X-direction and Y-direction may also be referred to as cross-sectional directions and the X-Y plane may be referred to as a cross-sectional plane. The intensity distribution of the pulsed laser beam 112 in a cross-sectional plane may be referred to as a cross-sectional intensity distribution. An example cross-section is depicted in FIG. 10, which is described in more detail below.

The pulsed laser beam 112 at the beam spot 114 or other cross sections may comprise a quasi-non-diffracting beam, for example, a beam having low beam divergence as mathematically defined below, by propagating the pulsed laser beam 112 (e.g., outputting the pulsed laser beam 112, such as a Gaussian beam, using a beam source 110) through an aspheric optical element 120, as described in more detail below with respect to the optical assembly 100 depicted in FIG. 3. Beam divergence refers to the rate of enlargement of the beam cross section in the direction of beam propagation (i.e., the Z direction from the beam source 110 to the one or more transparent workpieces 161). As used herein, the phrase "beam cross section" refers to the cross section of the pulsed laser beam 112 along a plane perpendicular to the beam propagation direction of the pulsed laser beam 112, for example, along the X-Y plane. One example beam cross section discussed herein is the beam spot 114 of the pulsed laser beam 112 projected onto the one or more transparent workpieces 161. Example quasi-non-diffracting beams include Gauss-Bessel beams and Bessel beams.

Diffraction is one factor that leads to divergence of the pulsed laser beam 112. Other factors include focusing or defocusing caused by the optical systems forming the pulsed laser beam 112 or refraction and scattering at interfaces. The pulsed laser beam 112 for forming the defects 172 of the contour 170 may have a beam spot 114 with a low divergence and weak diffraction. The divergence of the pulsed laser beam 112 is characterized by the Rayleigh range $Z_R$, which is related to the variance $\sigma^2$ of the intensity distribution and beam propagation factor $M^2$ of the pulsed laser beam 112. In the discussion that follows, formulas will be presented using a Cartesian coordinate system. Corresponding expressions for other coordinate systems are obtainable using mathematical techniques known to those of skill in the art. Additional information on beam divergence can be found in the articles entitled "New Developments in Laser Resonators" by A. E. Siegman in SPIE Symposium Series Vol. 1224, p. 2 (1990) and "$M^2$ factor of Bessel-Gauss beams" by R. Borghi and M. Santarsiero in Optics Letters, Vol. 22(5), 262 (1997), the disclosures of which are incorporated herein by reference in their entirety. Additional information can also be found in the international standards ISO 11146-1:2005(E) entitled "Lasers and laser-related equipment—Test methods for laser beam widths, divergence angles and beam propagation ratios—Part 1: Stigmatic and simple astigmatic beams", ISO 11146-2:2005(E) entitled "Lasers and laser-related equipment—Test methods for laser beam widths, divergence angles and beam propagation ratios—Part 2: General astigmatic beams", and ISO 11146-3:2004(E) entitled "Lasers and laser-related equipment—Test methods for laser beam widths, divergence angles and beam propagation ratios—Part 3: Intrinsic and geometrical laser beam classification, propagation and details of test methods", the disclosures of which are incorporated herein by reference in their entirety.

The spatial coordinates of the centroid of the intensity profile of the pulsed laser beam 112 having a time-averaged intensity profile I(x, y, z) are given by the following expressions:

$$\bar{x}(z) = \frac{\int_{-\infty}^{\infty}\int_{-\infty}^{\infty} xI(x, y, z)dxdy}{\int_{-\infty}^{\infty}\int_{-\infty}^{\infty} I(x, y, z)dxdy} \quad (7)$$

$$\bar{y}(z) = \frac{\int_{-\infty}^{\infty}\int_{-\infty}^{\infty} yI(x, y, z)dxdy}{\int_{-\infty}^{\infty}\int_{-\infty}^{\infty} I(x, y, z)dxdy} \quad (8)$$

These are also known as the first moments of the Wigner distribution and are described in Section 3.5 of ISO 11146-2:2005(E). Their measurement is described in Section 7 of ISO 11146-2:2005(E).

Variance is a measure of the width, in the cross-sectional (X-Y) plane, of the intensity distribution of the pulsed laser beam 112 as a function of position z in the direction of beam propagation. For an arbitrary laser beam, variance in the X-direction may differ from variance in the Y-direction. We let $\sigma_x^2(z)$ and $\sigma_y^2(z)$ represent the variances in the X-direction and Y-direction, respectively. Of particular interest are the variances in the near field and far field limits. We let $\sigma_{0x}^2(z)$ and $\sigma_{0y}^2(z)$ represent variances in the X-direction and Y-direction, respectively, in the near field limit, and we let $\sigma_{\infty x}^2(z)$ and $\sigma_{\infty y}^2(z)$ represent the variances in the X-direction and Y-direction, respectively, in the far field limit. For a laser beam having a time-averaged intensity profile I(x, y, z) with Fourier transform $\tilde{I}(v_x, v_y)$ (where $v_x$ and $v_y$ are spatial frequencies in the X-direction and Y-direction, respectively), the near field and far field variances in the X-direction and Y-direction are given by the following expressions:

$$\sigma_{0x}^2(z) = \frac{\int_{-\infty}^{\infty}\int_{-\infty}^{\infty} x^2 I(x, y, z)dxdy}{\int_{-\infty}^{\infty}\int_{-\infty}^{\infty} I(x, y, z)dxdy} \quad (9)$$

$$\sigma_{0y}^2(z) = \frac{\int_{-\infty}^{\infty}\int_{-\infty}^{\infty} y^2 I(x, y, z)dxdy}{\int_{-\infty}^{\infty}\int_{-\infty}^{\infty} I(x, y, z)dxdy} \quad (10)$$

$$\sigma_{\infty x}^2 = \frac{\int_{-\infty}^{\infty}\int_{-\infty}^{\infty} v_x^2 \tilde{I}(v_x, v_y)dv_x dv_y}{\int_{-\infty}^{\infty}\int_{-\infty}^{\infty} \tilde{I}(v_x, v_y)dv_x dv_y} \quad (11)$$

$$\sigma_{\infty y}^2 = \frac{\int_{-\infty}^{\infty}\int_{-\infty}^{\infty} v_y^2 \tilde{I}(v_x, v_y)dv_x dv_y}{\int_{-\infty}^{\infty}\int_{-\infty}^{\infty} \tilde{I}(v_x, v_y)dv_x dv_y} \quad (12)$$

The variance quantities $\sigma_{0x}^2(z)$, $\sigma_{0y}^2(z)$, $\sigma_{\infty x}^2$, and $\sigma_{\infty y}^2$ are also known as the diagonal elements of the Wigner distribution (see ISO 11146-2:2005(E)). These variances can be quantified for an experimental laser beam using the measurement techniques described in Section 7 of ISO 11146-2:2005(E). In brief, the measurement uses a linear unsaturated pixelated detector to measure I(x, y) over a finite spatial region that approximates the infinite integration area of the integral equations, which define the variances, and the centroid coordinates. The appropriate extent of the measurement area, background subtraction and the detector pixel resolution are determined by the convergence of an iterative measurement procedure described in Section 7 of ISO 11146-2:2005(E). The numerical values of the expressions given by Equations 7-12 are calculated numerically from the array of intensity values as measured by the pixelated detector.

It should also be noted that the origin of the x,y coordinate system used in equations 3 through equations 6 are the centroid of the laser beam.

Through the Fourier transform relationship between the transverse amplitude profile ũ(x, y, z) for an arbitrary optical beam (where I(x, y, z)≡|ũ(x, y, z)|²) and the spatial-frequency distribution $\tilde{P}(v_x, v_y, z)$ for an arbitrary optical beam (where $\tilde{I}(v_x, v_y) \equiv |\tilde{P}(v_x, v_y, z)|^2$), it can be shown that:

$$\sigma_x^2(z) = \sigma_{0x}^2(z_{0x}) + \lambda^2 \sigma_{\infty x}^2 (z - z_{0x})^2 \quad (13)$$

$$\sigma_y^2(z) = \sigma_{0y}^2(z_{0y}) + \lambda^2 \sigma_{\infty y}^2 (z - z_{0y})^2 \quad (14)$$

In Equations (13) and (14), $\sigma_{0x}^2(z_{0x})$ and $\sigma_{0y}^2(z_{0y})$ are minimum values of $\sigma_{0x}^2(z)$ and $\sigma_{0y}^2(z)$, which occur at waist positions $z_{0x}$ and $z_{0y}$ in the x-direction and y-direction, respectively, and λ is the wavelength of the pulsed laser beam 112. Equations (13) and (14) indicate that $\sigma_x^2(z)$ and $\sigma_y^2(z)$ increase quadratically with z in either direction from the minimum values associated with the waist position of the pulsed laser beam 112 (e.g., the waist portion of the pulsed laser beam focal line 113). Further, in the embodiments described herein comprising a beam spot 114 that is axisymmetric and thereby comprises an axisymmetric intensity distribution I(x,y), $\sigma_x^2(z) = \sigma_y^2(z)$ and in some embodiments comprising a beam spot 114 that is non-axisymmetric and thereby comprises a non-axisymmetric intensity distribution I(x,y), $\sigma_x^2(z) \neq \sigma_y^2(z)$, i.e., $\sigma_x^2(z) < \sigma_y^2(z)$ or $\sigma_x^2(z) > \sigma_y^2(z)$.

Equations (13) and (14) can be rewritten in terms of a beam propagation factor $M^2$, where separate beam propagations factors $M_x^2$ and $M_y^2$ for the x-direction and the y-direction are defined as:

$$M_x^2 = 4\pi \sigma_{0x} \sigma_{\infty x} \quad (15)$$

$$M_y^2 = 4\pi \sigma_{0y} \sigma_{\infty y} \quad (16)$$

Rearrangement of Equations (15) and (16) and substitution into Equations (13) and (14) yields:

$$\sigma_x^2(z) = \sigma_{0x}^2(z_{0x}) + \frac{\lambda^2 M_x^4}{(4\pi \sigma_{0x})^2}(z - z_{0x})^2 \quad (17)$$

$$\sigma_y^2(z) = \sigma_{0y}^2(z_{0y}) + \frac{\lambda^2 M_y^4}{(4\pi \sigma_{0y})^2}(z - z_{0y})^2 \quad (18)$$

which can be rewritten as:

$$\sigma_x^2(z) = \sigma_{0x}^2(z_{0x})\left[1 + \frac{(z - z_{0x})^2}{Z_{Rx}^2}\right] \quad (19)$$

$$\sigma_y^2(z) = \sigma_{0y}^2(z_{0y})\left[1 + \frac{(z - z_{0y})^2}{Z_{Ry}^2}\right] \quad (20)$$

where the Rayleigh ranges $Z_{Rx}$ and $Z_{Ry}$ in the x-direction and y-direction, respectively, are given by:

$$Z_{Rx} = \frac{4\pi \sigma_{0x}^2}{M_x^2 \lambda} \quad (21)$$

$$Z_{Ry} = \frac{4\pi \sigma_{0y}^2}{M_y^2 \lambda} \quad (22)$$

The Rayleigh range corresponds to the distance (relative to the position of the beam waist as defined in Section 3.12 of ISO 11146-1:2005(E)) over which the variance of the laser beam doubles (relative to the variance at the position of the beam waist) and is a measure of the divergence of the cross sectional area of the laser beam. Further, in the embodiments described herein comprising a beam spot 114 that is axisymmetric and thereby comprises an axisymmetric intensity distribution I(x,y), $Z_{Rx}=Z_{Ry}$ and in the embodiments described herein comprising a beam spot 114 that is non-axisymmetric and thereby comprises a non-axisymmetric intensity distribution I(x,y), $Z_{Rx} \neq Z_{Ry}$, i.e., $Z_{Rx} < Z_{Ry}$ or $Z_{Rx} > Z_{Ry}$. The Rayleigh range can also be observed as the distance along the beam axis at which the optical intensity decays to one half of its value observed at the beam waist location (location of maximum intensity). Laser beams with large Rayleigh ranges have low divergence and expand more slowly with distance in the beam propagation direction than laser beams with small Rayleigh ranges. For the purposes of defining the "length" of the focal lines or quasi-non-diffracting beams described in this document, the length can be stated to be the distance along the beam axis between the two half optical intensity points that can be measured on each side of the beam waist location.

The formulas above can be applied to any laser beam (not just Gaussian beams) by using the intensity profile I(x, y, z) that describes the laser beam. In the case of the $TEM_{00}$ mode of a Gaussian beam, the intensity profile is given by:

$$I(x, y) = \frac{\sqrt{\pi}}{2} w_o e^{\frac{-2(x^2+y^2)}{w_o^2}} \tag{23}$$

where $w_o$ is the radius (defined as the radius at which beam intensity decreases to $1/e^2$ of the peak beam intensity of the beam at a beam waist position $z_o$. From Equation (23) and the above formulas, we obtain the following results for a $TEM_{00}$ Gaussian beam:

$$\sigma_{0x}^2 = \sigma_{0y}^2 = \frac{w_o^2}{4} \tag{24}$$

$$\sigma_{\infty x}^2 = \sigma_{\infty y}^2 = \frac{1}{4\pi^2 w_o^2} \tag{25}$$

$$M_x^2 = 4\pi\sigma_{0x}\sigma_{\infty x} = 1 \tag{26}$$

$$M_y^2 = 4\pi\sigma_{0y}\sigma_{\infty y} = 1 \tag{27}$$

$$Z_{Rx} = \frac{4\pi\sigma_{0x}^2}{M_x^2 \lambda} = \frac{\pi w_0^2}{\lambda} \tag{28}$$

$$Z_{Ry} = \frac{4\pi\sigma_{0y}^2}{M_y^2 \lambda} = \frac{\pi w_0^2}{\lambda} \tag{29}$$

$$w^2(z) = w_0^2 + \frac{\lambda^2}{(\pi w_0)^2}(z-z_0)^2 = w_0^2\left[1 + \frac{(z-z_0)^2}{Z_R^2}\right] \tag{30}$$

where $Z_R = Z_{Rx} = Z_{Ry}$. For Gaussian beams, it is further noted that $M^2 = M_x^2 = M_y^2 = 1$.

Beam cross section is characterized by shape and dimensions. The dimensions of the beam cross section are characterized by a spot size of the beam. For a Gaussian beam, spot size is frequently defined as the radial extent at which the intensity of the beam decreases to $1/e^2$ of its maximum value, denoted in Equation (23) as $w_0$. The maximum intensity of a Gaussian beam occurs at the center (x=0 and y=0 (Cartesian) or r=0 (cylindrical)) of the intensity distribution and radial extent used to determine spot size is measured relative to the center.

Beams with axisymmetric (i.e. rotationally symmetric around the beam propagation axis Z) cross sections can be characterized by a single dimension or spot size that is measured at the beam waist location as specified in Section 3.12 of ISO 11146-1:2005(E). For a Gaussian beam, Equation (23) shows that spot size is equal to $w_o$, which from Equation (24) corresponds to $2\sigma_{0x}$ or $2\sigma_{0y}$. For an axisymmetric beam having an axisymmetric cross section, such as a circular cross section, $\sigma_{0x} = \sigma_{0y}$. Thus, for axisymmetric beams, the cross section dimension may be characterized with a single spot size parameter, where $w_o = 2\sigma_0$. Spot size can be similarly defined for non-axisymmetric beam cross sections where, unlike an axisymmetric beam, $\sigma_{0x} \neq \sigma_{0y}$. Thus, when the spot size of the beam is non-axisymmetric, it is necessary to characterize the cross-sectional dimensions of a non-axisymmetric beam with two spot size parameters: $w_{ox}$ and $w_{oy}$, in the x-direction and y-direction, respectively, where $$w_{ox} = 2\sigma_{0x} \tag{31}$$

$$w_{oy} = 2\sigma_{0y} \tag{32}$$

Further, the lack of axial (i.e. arbitrary rotation angle) symmetry for a non-axisymmetric beam means that the results of a calculation of values of $\sigma_{0x}$ and $\sigma_{0y}$ will depend on the choice of orientation of the X-axis and Y-axis. ISO 11146-1:2005(E) refers to these reference axes as the principal axes of the power density distribution (Section 3.3-3.5) and in the following discussion we will assume that the X and Y axes are aligned with these principal axes. Further, an angle φ about which the X-axis and Y-axis may be rotated in the cross-sectional plane (e.g., an angle of the X-axis and Y-axis relative to reference positions for the X-axis and Y-axis, respectively) may be used to define minimum ($w_{o,min}$) and maximum values ($w_{o,max}$) of the spot size parameters for a non-axisymmetric beam:

$$w_{o,min} = 2\sigma_{0,min} \tag{33}$$

$$w_{o,max} = 2\sigma_{0,max} \tag{34}$$

where $2\sigma_{0,min} = 2\sigma_{0x}(\phi_{min,x}) = 2\sigma_{0y}(\phi_{min,y})$ and $2\sigma_{0,max} = 2\sigma_{0x}(\phi_{max,x}) = 2\sigma_{0y}(\phi_{max,y})$ The magnitude of the axial asymmetry of the beam cross section can be quantified by the aspect ratio, where the aspect ratio is defined as the ratio of $w_{o,max}$ to $w_{o,min}$. An axisymmetric beam cross section has an aspect ratio of 1.0, while elliptical and other non-axisymmetric beam cross sections have aspect ratios greater than 1.0, for example, greater than 1.1, greater than 1.2, greater than 1.3, greater than 1.4, greater than 1.5, greater than 1.6, greater than 1.7, greater than 1.8, greater than 1.9, greater than 2.0, greater than 3.0, greater than 5.0, greater than 10.0, or the like To promote uniformity of defects 172 in the beam propagation direction (e.g. depth dimension of the one or more transparent workpieces 161), a pulsed laser beam 112 having low divergence may be used. In one or more embodiments, the pulsed laser beam 112 having a low divergence may be utilized for forming defects 172. As noted above, divergence can be characterized by the Rayleigh range. For non-axisymmetric beams, Rayleigh ranges for the principal axes X and Y are defined by Equations (21) and (22) for the X-direction and Y-direction, respectively, where it can be shown that for any real beam, $M_x^2 > 1$ and $M_y^2 > 1$ and where $\sigma_{0x}^2$ and $\sigma_{0y}^2$ are determined by the intensity distribution of the laser beam. For symmetric beams, Rayleigh range is the same in the X-direction and Y-direction and is expressed by Equation (28) or Equation (29). Low divergence correlates with large values of the Rayleigh range and weak diffraction of the laser beam.

Beams with Gaussian intensity profiles may be less preferred for laser processing to form defects 172 because, when focused to small enough spot sizes (such as spot sizes in the range of microns, such as about 1-5 µm or about 1-10 µm) to enable available laser pulse energies to modify materials such as glass, they are highly diffracting and diverge significantly over short propagation distances. To achieve low divergence, it is desirable to control or optimize the intensity distribution of the pulsed laser beam 112 to reduce diffraction. Pulsed laser beams may be non-diffracting or weakly diffracting. Weakly diffracting laser beams include quasi-non-diffracting laser beams. Representative weakly diffracting laser beams include Bessel beams, Gauss-Bessel beams, Airy beams, Weber beams, and Mathieu beams.

For non-axisymmetric beams, the Rayleigh ranges $Z_{Rx}$ and $Z_{Ry}$ are unequal. Equations (21) and (22) indicate that $Z_{Rx}$ and $Z_{Ry}$ depend on $\sigma_{0x}$ and $\sigma_{0y}$, respectively, and above we noted that the values of $\sigma_{0x}$ and $\sigma_{0y}$ depend on the orientation of the X-axis and Y-axis. The values of $Z_{Rx}$ and $Z_{Ry}$ will accordingly vary, and each will have a minimum value and a maximum value that correspond to the principal axes, with the minimum value of $Z_{Rx}$ being denoted as $Z_{Rx,min}$ and the minimum value of $Z_{Ry}$ being denoted $Z_{Ry,min}$ for an arbitrary beam profile $Z_{Rx,min}$ and $Z_{Ry,min}$ can be shown to be given by $$Z_{Rx,min} = \frac{4\pi\sigma_{0,min}^2}{M_x^2 \lambda} \quad (35)$$

and $$Z_{Ry,min} = \frac{4\pi\sigma_{0,min}^2}{M_y^2 \lambda} \quad (36)$$

Figure 13:
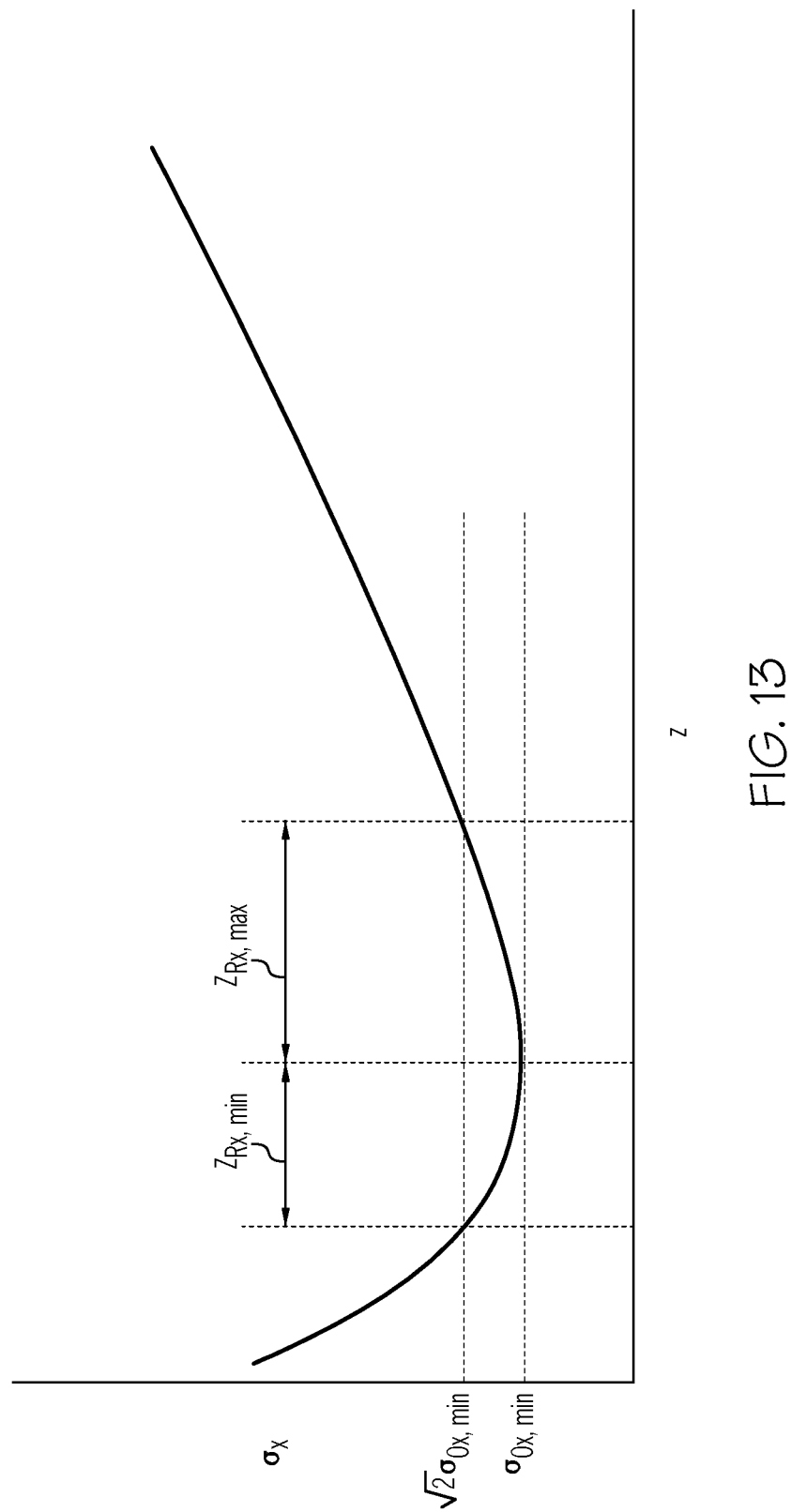
FIG. 13 graphically depicts a curve representing a Gaussian beam, according to one or more embodiments shown and described herein.

Referring to FIG. 13, for a Gaussian beam the expectation is that the curve is symmetric about $Z_{0x}$ but this is not necessarily the case for all beams. In the case of asymmetry (as shown in the plot below), there is a $Z_{Rx,min}$ and a $Z_{Rx,max}$ where both are measured from the minimum at $Z_{0x}$ to a Z value at which the $\sigma_{0x,min}$ has increased by a factor of $\sqrt{2}$. $Z_{Rx,min}$ is clearly the smaller of the two values while $Z_{Rx,max}$ is the larger. The same analysis can be done of the perpendicular y-axis.

Since divergence of the laser beam occurs over a shorter distance in the direction having the smallest Rayleigh range, the intensity distribution of the pulsed laser beam 112 used to form defects 172 may be controlled so that the minimum values of $Z_{Rx}$ and $Z_{Ry}$ (or for axisymmetric beams, the value of $Z_R$) are as large as possible. Since the minimum value $Z_{Rx,min}$ of $Z_{Rx}$ and the minimum value $Z_{Ry,min}$ of $Z_{Ry}$ differ for a non-axisymmetric beam, a pulsed laser beam 112 may be used with an intensity distribution that makes the smaller of $Z_{Rx,min}$ and $Z_{Ry,min}$ as large as possible when forming damage regions.

In different embodiments, the smaller of $Z_{Rx,min}$ and $Z_{Ry,min}$ (or for axisymmetric beams, the value of $Z_R$) is greater than or equal to 50 µm, greater than or equal to 100 µm, greater than or equal to 200 µm, greater than or equal to 300 µm, greater than or equal to 500 µm, greater than or equal to 1 mm, greater than or equal to 2 mm, greater than or equal to 3 mm, greater than or equal to 5 mm, in the range from 50 µm to 10 mm, in the range from 100 µm to 5 mm, in the range from 200 µm to 4 mm, in the range from 300 µm to 2 mm, or the like.

The values and ranges for the smaller of $Z_{Rx,min}$ and $Z_{Ry,min}$ (or for axisymmetric beams, the value of $Z_R$) specified herein are achievable for different wavelengths to which the workpiece is transparent through adjustment of the spot size parameter $w_{o,min}$ defined in Equation (33). In different embodiments, the spot size parameter $w_{o,min}$ is greater than or equal to 0.25 µm, greater than or equal to 0.50 µm, greater than or equal to 0.75 µm, greater than or equal to 1.0 µm, greater than or equal to 2.0 µm, greater than or equal to 3.0 µm, greater than or equal to 5.0 µm, in the range from 0.25 µm to 10 µm, in the range from 0.25 µm to 5.0 µm, in the range from 0.25 µm to 2.5 µm, in the range from 0.50 µm to 10 µm, in the range from 0.50 µm to 5.0 µm, in the range from 0.50 µm to 2.5 µm, in the range from 0.75 µm to 10 µm, in the range from 0.75 µm to 5.0 µm, in the range from 0.75 µm to 2.5 µm, or the like.

Non-diffracting or quasi-non-diffracting beams generally have complicated intensity profiles, such as those that decrease non-monotonically vs. radius. By analogy to a Gaussian beam, an effective spot size $w_{o,eff}$ can be defined for non-axisymmetric beams as the shortest radial distance, in any direction, from the radial position of the maximum intensity (r=0) at which the intensity decreases to $1/e^2$ of the maximum intensity. Further, for axisymmetric beams $w_{o,eff}$ is the radial distance from the radial position of the maximum intensity (r=0) at which the intensity decreases to $1/e^2$ of the maximum intensity. A criterion for Rayleigh range based on the effective spot size $w_{o,eff}$ for non-axisymmetric beams or the spot size $w_o$ for axisymmetric beams can be specified as non-diffracting or quasi-non-diffracting beams for forming damage regions using Equation (37) for non-axisymmetric beams and Equation (38) for axisymmetric beams, below:

$$\text{Smaller of } Z_{Rx,min}, Z_{Ry,min} > F_D \frac{\pi w_{0,eff}^2}{\lambda} \quad (37)$$

$$Z_R > F_D \frac{\pi w_0^2}{\lambda} \quad (38)$$

where $F_D$ is a dimensionless divergence factor having a value of at least 10, at least 50, at least 100, at least 250, at least 500, at least 1000, in the range from 10 to 2000, in the range from 50 to 1500, in the range from 100 to 1000. By comparing Equation (37) to Equation (28) or (29), one can see that for a non-diffracting or quasi-non-diffracting beam the distance, Smaller of $Z_{Rx,min}$, $Z_{Ry,min}$ in Equation (37), over which the effective beam size doubles, is $F_D$ times the distance expected if a typical Gaussian beam profile were used. The dimensionless divergence factor $F_D$ provides a criterion for determining whether or not a laser beam is quasi-non-diffracting. As used herein, the pulsed laser beam 112 is considered quasi-non-diffracting if the characteristics of the laser beam satisfy Equation (37) or Equation (38) with a value of $F_D \geq 10$. As the value of $F_D$ increases, the pulsed laser beam 112 approaches a more nearly perfectly non-diffracting state. Moreover, it should be understood that Equation (38) is merely a simplification of Equation (37) and as such, Equation (38) mathematically describes the dimensionless divergence factor $F_D$ for both axisymmetric and non-axisymmetric pulsed laser beams 112.

The following outlines the procedure for determining $F_D$. First, measure the beam intensity I(x,y) profiles for a series of locations along the optical axis 102. This must be done across a suitable range of z-locations so that the measurement encompasses a region where the beam intensity reaches a maximum as a function of z, and drops to less than one-half that maximum level on both sides of that z-location. Second, measure the Rayleigh range of the beam. From the above images, measure the z-distance it takes for the beam to drop from maximum intensity to one-half the peak intensity. Third, calculate $W_{o,eff}$ of the beam. This should be evaluated using the beam profile (image) measured at the z-location of the beam waist (maximum intensity location on z-axis). Measure $W_o$ for both the major and minor axes of the beam profile—the radial distance for the beam intensity to drop to $1/e^2$ of its peak. $W_{o,eff}$ is the smaller of these. Fourth, compare the measured Rayleigh range to the Rayleigh range predicted by $W_{o,eff}$ alone. Evaluate $F_D = Z_{Rx,min}/(\pi W^2_{o,eff}/\lambda)$. If it is >10 you have a quasi-non-diffracting beam.

Figures 14A, 14B:
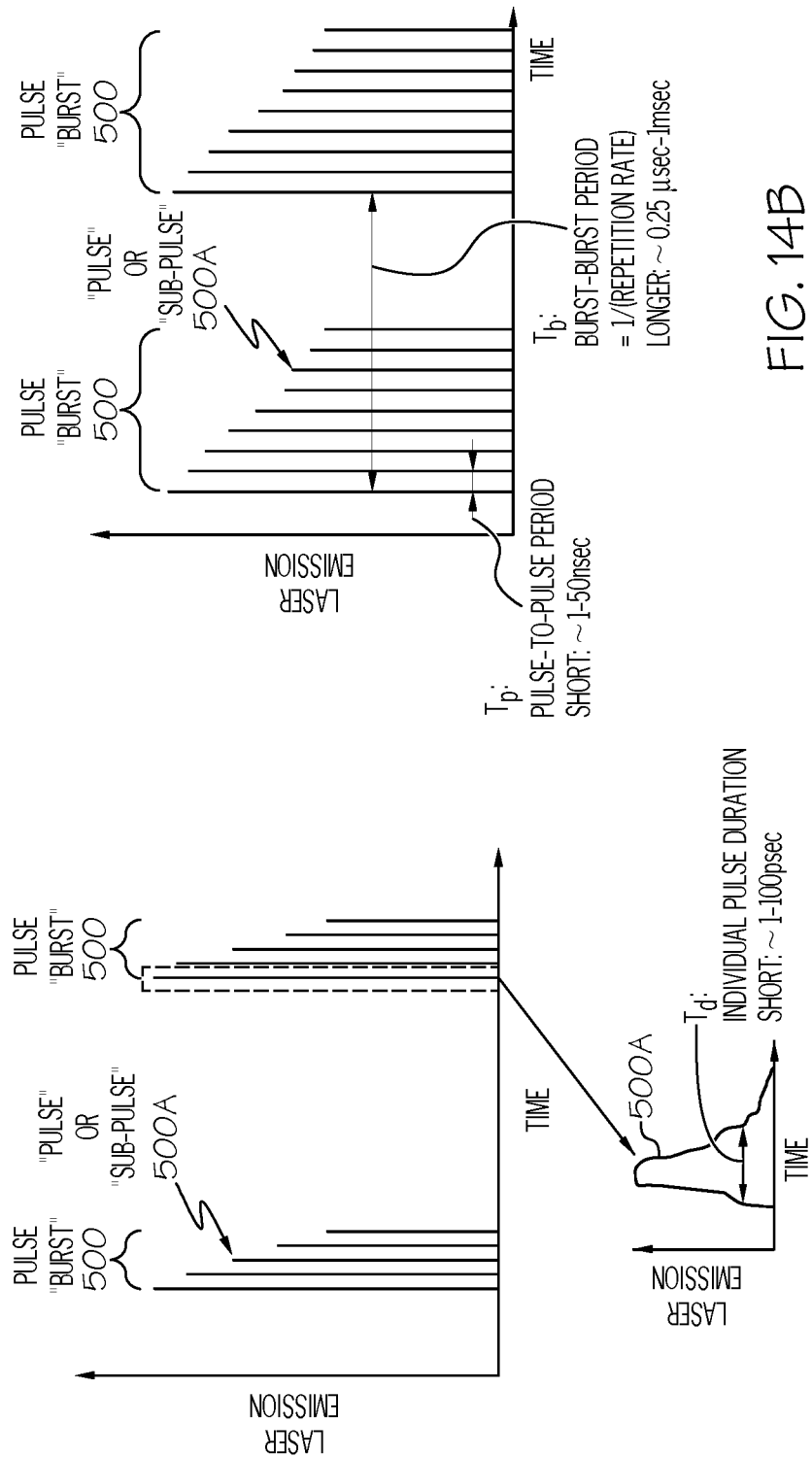
FIG. 14A graphically depicts the relative intensity of laser pulses within an exemplary pulse burst vs. time, according to one or more embodiments shown and described herein.
FIG. 14B graphically depicts relative intensity of laser pulses vs. time within another exemplary pulse burst, according to one or more embodiments shown and described herein.

Referring also to FIGS. 14A and 14B, in addition to a single pulse operation at the aforementioned individual pulse repetition rates, the pulses may be produced in pulse bursts 500 of two sub-pulses 500A or more (such as, for example, 3 sub-pulses, 4 sub-pulses, 5 sub-pulses, 10 sub-pulses, 15 sub-pulses, 20 sub-pulses, or more per pulse burst, such as from 1 to 30 sub-pulses per pulse burst 500, or from 5 to 20 sub-pulses per pulse burst 500). While not intending to be limited by theory, a pulse burst is a short and fast grouping of sub-pulses that creates an optical energy interaction with the material (i.e. MPA in the material of the one or more transparent workpieces 161) on a time scale not easily accessible using a single-pulse operation. While still not intending to be limited by theory, the energy within a pulse burst (i.e. the pulse burst energy) is conserved. As an illustrative example, for a pulse burst having an energy of 100 μJ per pulse burst and 2 sub-pulses, the 100 μJ per pulse burst energy is split between the 2 sub-pulses for an average energy of 50 μJ per sub-pulse and for a pulse burst having an energy of 100 μJ per pulse burst and 10 sub-pulses, the 100 μJ per pulse burst is split amongst the 10 sub-pulses for an average energy of 10 μJ per sub-pulse. Further, the energy distribution among the sub-pulses of a pulse burst does not need to be uniform. In fact, in some instances, the energy distribution among the sub-pulses of a pulse burst is in the form of an exponential decay, where the first sub-pulse of the pulse burst contains the most energy, the second sub-pulse of the pulse burst contains slightly less energy, the third sub-pulse of the pulse burst contains even less energy, and so on. However, other energy distributions within an individual pulse burst are also possible, where the exact energy of each sub-pulse can be tailored to effect different amounts of modification to the one or more transparent workpieces 161.

While still not intending to be limited by theory, when the defects 172 of the contour 170 are formed with pulse bursts having at least two sub-pulses, the force necessary to separate the one or more transparent workpieces 161 along the contour 170 (i.e. the maximum break resistance) is reduced compared to the maximum break resistance of a contour 170 with the same spacing between adjacent defects 172 in an identical transparent workpiece 161a, 161b that is formed using a single pulse laser. For example, the maximum break resistance of a contour 170 formed using a single pulse is at least two times greater than the maximum break resistance of a contour 170 formed using a pulse burst having two or more sub-pulses. Further, the difference in maximum break resistance between a contour 170 formed using a single pulse and a contour 170 formed using a pulse burst having two sub-pulses is greater than the difference in maximum break resistance between a contour 170 formed using a pulse burst having two sub-pulses and a pulse burst having three sub-pulses. Thus, pulse bursts may be used to form contours 170 that separate easier than contours 170 formed using a single pulse laser.

Referring still to FIGS. 14A and 14B, the sub-pulses 500A within the pulse burst 500 may be separated by a duration that is in a range from about 1 nsec to about 50 nsec, for example, from about 10 nsec to about 30 nsec, such as about 20 nsec. In other embodiments, the sub-pulses 500A within the pulse burst 500 may be separated by a duration of up to 100 psec (for example, 0.1 psec, 5 psec, 10 psec, 15 psec, 18 psec, 20 psec, 22 psec, 25 psec, 30 psec, 50 psec, 75 psec, or any range there between). For a given laser, the time separation $T_p$ (FIG. 16B) between adjacent sub-pulses 500A within a pulse burst 500 may be relatively uniform (e.g., within about 10% of one another). For example, in some embodiments, each sub-pulse 500A within a pulse burst 500 is separated in time from the subsequent sub-pulse by approximately 20 nsec (50 MHz). Further, the time between each pulse burst 500 may be from about 0.25 microseconds to about 1000 microseconds, e.g., from about 1 microsecond to about 10 microseconds, or from about 3 microseconds to about 8 microseconds.

In some of the exemplary embodiments of the beam source 110 described herein, the time separation $T_b$ (FIG. 14B) is about 5 microseconds for the beam source 110 outputting a pulsed laser beam 112 comprising a burst repetition rate of about 200 kHz. The laser burst repetition rate is related to the time $T_b$ between the first pulse in a burst to the first pulse in the subsequent burst (laser burst repetition rate=$1/T_b$). In some embodiments, the laser burst repetition rate may be in a range of from about 1 kHz to about 4 MHz. In embodiments, the laser burst repetition rates may be, for example, in a range of from about 10 kHz to 650 kHz. The time $T_b$ between the first pulse in each burst to the first pulse in the subsequent burst may be from about 0.25 microsecond (4 MHz burst repetition rate) to about 1000 microseconds (1 kHz burst repetition rate), for example from about 0.5 microseconds (2 MHz burst repetition rate) to about 40 microseconds (25 kHz burst repetition rate), or from about 2 microseconds (500 kHz burst repetition rate) to about 20 microseconds (50 k Hz burst repetition rate). The exact timing, pulse duration, and burst repetition rate may vary depending on the laser design, but short pulses ($T_d$<20 psec and, in some embodiments, $T_d \leq 15$ psec) of high intensity have been shown to work particularly well.

The burst repetition rate may be in a range of from about 1 kHz to about 2 MHz, such as from about 1 kHz to about 200 kHz. Bursting or producing pulse bursts 500 is a type of laser operation where the emission of sub-pulses 500A is not in a uniform and steady stream but rather in tight clusters of pulse bursts 500. The pulse burst laser beam may have a wavelength selected based on the material of the one or more transparent workpieces 161 being operated on such that the material of the one or more transparent workpieces 161 is substantially transparent at the wavelength. The average laser power per burst measured at the material may be at least about 40 μJ per mm of thickness of material. For example, in embodiments, the average laser power per burst may be from about 40 μJ/mm to about 2500 μJ/mm, or from about 500 μJ/mm to about 2250 μJ/mm. In a specific example, for 0.5 mm to 0.7 mm thick Corning EAGLE XG® transparent workpiece, pulse bursts of from about 300 μJ to about 600 µJ may cut and/or separate the workpiece, which corresponds to an exemplary range of about 428 µJ/mm to about 1200 µJ/mm (i.e., 300 µJ/0.7 mm for 0.7 mm EAGLE XG® glass and 600 µJ/0.5 mm for a 0.5 mm EAGLE XG® glass).

The energy required to modify the one or more transparent workpieces 161 is the pulse energy, which may be described in terms of pules burst energy (i.e., the energy contained within a pulse burst 500 where each pulse burst 500 contains a series of sub-pulses 500A), or in terms of the energy contained within a single laser pulse. The pulse energy (for example, the pulse burst energy or the energy of a single laser pulse) may be from about 25 µJ to about 750 µJ, e.g., from about 50 µJ to about 500 µJ, or from about 50 µJ to about 250 µJ. For some glass compositions, the pulse energy (e.g., pulse burst energy) may be from about 100 µJ to about 250 µJ. However, for display or TFT glass compositions, the pulse energy (e.g., pulse burst energy) may be higher (e.g., from about 300 µJ to about 500 µJ, or from about 400 µJ to about 600 µJ, depending on the specific glass composition of the one or more transparent workpieces 161). While not intending to be limited by theory, the use of a pulsed laser beam 112 capable of generating pulse bursts is advantageous for cutting or modifying transparent materials, for example glass. In contrast with the use of single pulses spaced apart in time by the repetition rate of the single-pulsed laser, the use of a burst sequence that spreads the pulse energy over a rapid sequence of sub-pulses within the burst allows access to larger timescales of high intensity interaction with the material than is possible with single-pulse lasers.

Referring again to FIG. 3, the aspheric optical element 120 is positioned within the beam pathway 111 between the beam source 110 and the substrate stack 160. In operation, propagating the pulsed laser beam 112, e.g., an incoming Gaussian beam, through the aspheric optical element 120 may alter the pulsed laser beam 112 such that the portion of the pulsed laser beam 112 propagating beyond the aspheric optical element 120 is quasi-non-diffracting, as described above. The aspheric optical element 120 may comprise any optical element comprising an aspherical shape. In some embodiments, the aspheric optical element 120 may comprise a conical wavefront producing optical element, such as an axicon 122, for example, a negative refractive axicon 122, a positive refractive axicon 122, a reflective axicon 122, a diffractive axicon 122, a programmable spatial light modulator axicon 122 (e.g., a phase axicon 122), or the like.

In some embodiments, the aspheric optical element 120 comprises at least one aspheric surface whose shape is mathematically described as: $z'=(cr^2/1)+(1-(1+k)(c^2r^2))^{1/2}+(a_1r+a_2r^2+a_3r^3+a_4r^4+a_5r^5+a_6r^6+a_7r^7+a_8r^8+a_9r^9+a_{10}r^{10}+a_{11}r^{11}+a_{12}r^{12}$ where z' is the surface sag of the aspheric surface, r is the distance between the aspheric surface and the optical axis 102 in a radial direction (e.g., in an X-direction or a Y-direction), c is the surface curvature of the aspheric surface (i.e. $c_i=1/R_i$, where R is the surface radius of the aspheric surface), k is the conic constant, and coefficients $a_i$ are the first through the twelfth order aspheric coefficients or higher order aspheric coefficients (polynomial aspheres) describing the aspheric surface. In one example embodiment, at least one aspheric surface of the aspheric optical element 120 includes the following coefficients $a_1-a_7$, respectively: −0.085274788; 0.065748845; 0.077574995; −0.054148636; 0.022077021; −0.0054987472; 0.0006682955; and the aspheric coefficients $a_8-a_{12}$ are 0. In this embodiment, the at least one aspheric surface has the conic constant k=0. However, because the $a_1$ coefficient has a nonzero value, this is equivalent to having a conic constant k with a non-zero value. Accordingly, an equivalent surface may be described by specifying a conic constant k that is non zero, a coefficient $a_1$ that is non-zero, or a combination of a nonzero k and a non-zero coefficient $a_1$. Further, in some embodiments, the at least one aspheric surface is described or defined by at least one higher order aspheric coefficients $a_2-a_{12}$ with non-zero value (i.e., at least one of $a_2, a_3 \ldots, a_{12} \neq 0$). In one example embodiment, the aspheric optical element 120 comprises a third-order aspheric optical element such as a cubically shaped optical element, which comprises a coefficient $a_3$ that is non-zero.

In some embodiments, when the aspheric optical element 120 comprises an axicon 122 (as depicted in FIG. 3), the axicon 122 may have a laser output surface 126 (e.g., conical surface) having an angle of about 1.2°, such as from about 0.5° to about 5°, or from about 1° to about 1.5°, or even from about 0.5° to about 20°, the angle measured relative to the laser input surface 124 (e.g., flat surface) upon which the pulsed laser beam 112 enters the axicon 122. Further, the laser output surface 126 terminates at a conical tip. Moreover, the aspheric optical element 120 includes a centerline axis 125 extending from the laser input surface 124 to the laser output surface 126 and terminating at the conical tip. In other embodiments, the aspheric optical element 120 may comprise a waxicon, a spatial phase modulator such as a spatial light modulator, or a diffractive optical grating. In operation, the aspheric optical element 120 shapes the incoming pulsed laser beam 112 (e.g., an incoming Gaussian beam) into a quasi-non-diffracting beam, which, in turn, is directed through the first lens 130 and the second lens 132.

Referring still to FIG. 3, the first lens 130 is positioned upstream the second lens 132 and may collimate the pulsed laser beam 112 within a collimation space 134 between the first lens 130 and the second lens 132. Further, the second lens 132 may focus the pulsed laser beam 112 into the one or more transparent workpieces 161, which may be positioned at an imaging plane 104. In some embodiments, the first lens 130 and the second lens 132 each comprise plano-convex lenses. When the first lens 130 and the second lens 132 each comprise plano-convex lenses, the curvature of the first lens 130 and the second lens 132 may each be oriented toward the collimation space 134. In other embodiments, the first lens 130 may comprise other collimating lenses and the second lens 132 may comprise a meniscus lens, an asphere, or another higher-order corrected focusing lens.

Referring again to FIGS. 1-14B, methods of laser processing a substrate stack 160 are depicted and described. The substrate stack 160 may include one or more transparent workpieces 161 and a black matrix layer 163. The method may include forming a contour 170 comprising defects 172 in the one or more transparent workpieces 161 (e.g., in the first transparent workpiece 161a, the second transparent workpiece 161b, or both the first and the second transparent workpiece 161a and 161b as shown in FIG. 1). Additionally, the method may include directing the pulsed laser beam 112 oriented along the beam pathway 111 and outputting by the beam source 110 through the aspheric optical element 120 and a focusing optic, a pulsed laser beam 112. The focusing optic may include for example, a second lens 132. The pulsed laser beam may be directed into the substrate stack 160 such that the portion of the pulsed laser beam 112 generates an induced absorption within at least one of the one or more transparent workpieces 161. In some embodiments, the induced absorption is offset by a distance from the edge of the black matrix layer where the distance is 20% or less the total thickness of the substrate stack 160. In some embodiments, this distance may be 15% or less or even 10% or less.

For example, in embodiments using the pulsed laser beam 112, the pulsed laser beam 112 may comprise a pulse energy and a pulse duration sufficient to exceed a damage threshold of the one or more transparent workpieces 161. In some embodiments, directing the pulsed laser beam 112 into the one or more transparent workpieces 161 comprises focusing the pulsed laser beam 112 output by the beam source 110 into the pulsed laser beam focal line 113 oriented along the beam propagation direction (e.g., the Z axis from the beam source 110 to the one or more transparent workpieces 161). The one or more transparent workpieces 161 are positioned in the beam pathway 111 to at least partially overlap the pulsed laser beam focal line 113 of pulsed laser beam 112. The pulsed laser beam focal line 113 is thus directed into the one or more transparent workpieces 161. The pulsed laser beam 112, e.g., the pulsed laser beam focal line 113 generates induced absorption within the one or more transparent workpieces 161 to create defects 172 in the one or more transparent workpieces 161. In some embodiments, individual defects 172 may be created at rates of several hundred kilohertz (i.e., several hundred thousand defects 172 per second).

In some embodiments, the aspheric optical element 120 may focus the pulsed laser beam 112 into the pulsed laser beam focal line 113. In operation, the position of the pulsed laser beam focal line 113 may be controlled by suitably positioning and/or aligning the pulsed laser beam 112 relative to the one or more transparent workpieces 161 as well as by suitably selecting the parameters of the optical assembly 100. For example, the position of the pulsed laser beam focal line 113 may be controlled along the Z-axis and about the Z-axis. Further, the pulsed laser beam focal line 113 may have a length in a range of from about 0.1 mm to about 100 mm or in a range of from about 0.1 mm to about 10 mm. Various embodiments may be configured to have a pulsed laser beam focal line 113 with a length 1 of about 0.1 mm, about 0.2 mm, about 0.3 mm, about 0.4 mm, about 0.5 mm, about 0.7 mm, about 1 mm, about 2 mm, about 3 mm, about 4 mm, or about 5 mm e.g., from about 0.5 mm to about 5 mm.

Referring cumulatively to FIGS. 1-14B, the method for forming the contour 170 comprising defects 172 along the contour line 165 may include translating the substrate stack 160 relative to the pulsed laser beam 112 (or the pulsed laser beam 112 may be translated relative to the substrate stack 160) to form the contour 170 in at least one of the one or more transparent workpieces 161.

Figure 15:
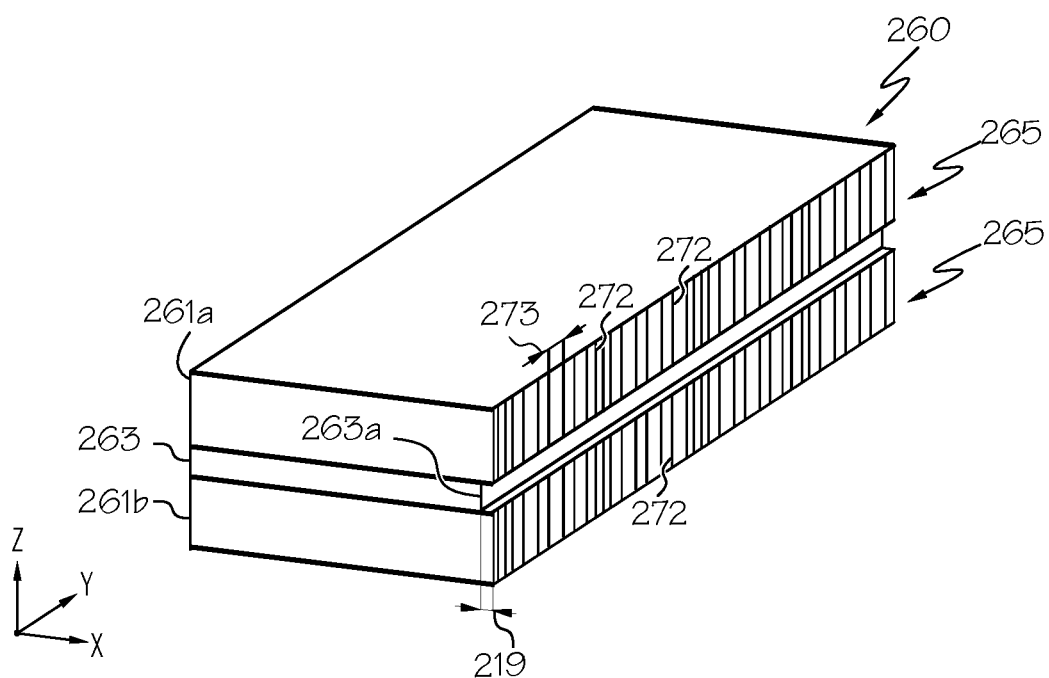
FIG. 15 schematically depicts a glass article formed according to one or more embodiments shown and described herein.

Referring to FIG. 15, a glass article formed by one or more of the methods disclosed herein is depicted. The glass article 260, includes a black matrix layer 263 disposed between a first transparent workpiece 261a and a second transparent workpiece 261b. As depicted, an edge of the black matrix layer 263 is offset by a distance 219 from a separated edge 265 of the first and second transparent workpiece 261a and 261b. The distance 219 corresponds to the offset 119 of the pulsed laser beam focal line 131e from the edge 163a of the black matrix layer 163, as shown and described in at least FIG. 5E. The distance between the separated edge 265 of the first and second transparent workpiece 261a and 262b and the black matrix layer is about 20% or less the total thickness of the substrate stack. In some embodiments, the distance 219 is about 15% or less of the total thickness of the substrate stack. In some embodiments, the distance 219 is about 10% or less of the total thickness of the substrate stack.

Referring still to FIG. 15, the separated edge 265 of the first and second transparent workpiece 261a and 261b includes a plurality of vertical striations 272. The plurality of vertical striations 272 may be spaced apart from one another by a pitch 273 of about 0.1 μm to about 500 μm, for example, about 1 μm to about 200 μm, about 2 μm to about 100 μm, about 5 μm to about 20 μm, or the like. For example, suitable spacing between each of the plurality of vertical striations 272 may be from about 0.1 μm to about 50 μm, such as from about 5 μm to about 15 μm, from about 5 μm to about 12 μm, from about 7 μm to about 15 μm, or from about 7 μm to about 12 μm for the TFT/display glass compositions. In some embodiments, a spacing between adjacent each of the plurality of vertical striations 272 may be about 50 μm or less, 45 μm or less, 40 μm or less, 35 μm or less, 30 μm or less, 25 μm or less, 20 μm or less, 15 μm or less, 10 μm or less, or the like. The plurality of vertical striations 272 may be formed as a result of the defects 172 (FIG. 1) when translating the substrate stack 160 relative to the pulsed laser beam 112.

In some embodiments, the defects 172, similarly, may be spaced apart from one another by a distance along the contour 170 of from about 0.1 μm to about 500 μm, for example, about 1 μm to about 200 μm, about 2 μm to about 100 μm, about 5 μm to about 20 μm, or the like. For example, suitable spacing between the defects 172 may be from about 0.1 μm to about 50 μm, such as from about 5 μm to about 15 μm, from about 5 μm to about 12 μm, from about 7 μm to about 15 μm, or from about 7 μm to about 12 μm for the TFT/display glass compositions. In some embodiments, a spacing between adjacent defects 172 may be about 50 μm or less, 45 μm or less, 40 μm or less, 35 μm or less, 30 μm or less, 25 μm or less, 20 μm or less, 15 μm or less, 10 μm or less, or the like. Further, the translation of the substrate stack 160 relative to the pulsed laser beam 112 may be performed by moving the one or more transparent workpieces 161 and/or the beam source 110 using one or more translation stages 190.

Although the example glass article 260 depicted in FIG. 15 includes a first and second transparent workpiece 261a and 261b, it is understood that other embodiments may include only transparent workpiece and a black matrix layer. Furthermore, in some embodiments, there may be two or more transparent workpieces and one or more black matrix layers.

In view of the foregoing description, it should be understood that the method for laser processing a substrate stack (e.g., to form a glass article) includes forming a defect in a transparent workpiece of the substrate stack where the substrate stack further includes a black matrix layer. Forming the defect includes directing a portion of a pulsed laser beam into the transparent workpiece. The pulsed laser beam includes a wavelength λ, a spot size $w_o$, and a Rayleigh range $Z_R$ that is greater than $$F_D \frac{\pi w_0^2}{\lambda},$$

where $F_D$ is a dimensionless divergence factor comprising a value of 10 or greater. The pulsed laser beam directed into the transparent workpiece of the substrate stack includes a pulsed laser beam focal line and generates an induced absorption within the transparent workpiece at a distance from an edge of the black matrix layer. The distance is about 20% or less of a total thickness of the substrate stack.

Additionally, in some embodiments a method of laser processing a substrate stack includes a transparent work piece and a black matrix layer may include forming a contour comprising defects in the transparent workpiece. Forming the contour includes directing a pulsed laser beam oriented along a beam pathway and output by a beam source through an aspheric optical element and a focusing optic into the substrate stack. A portion of the pulsed laser beam directed into the transparent workpiece generates an induced absorption within the transparent workpiece. The induced absorption produces a defect within the transparent workpiece and the pulse laser beam includes an incoming beam diameter at the focusing optic such that the portion of the pulsed laser beam directed into the transparent workpiece has a numerical aperture of about 0.05 to about 0.4.

In other embodiments, the pulsed laser beam oriented along a beam pathway and output by a beam source through an aspheric optical element, through a modified aperture and then a focusing optic. In yet other embodiments, the effective focal line length L' may be greater than about 10% or less the thickness of the substrate stack. Taken together, the methods and systems described herein provide improved laser processing methods, in particular for substrate stacks that include a black matrix layer. The methods and systems allow for cutting of substrate stacks having a black matrix layer meanwhile reducing and even eliminating damage to the black matrix layer during laser processing. The reduction or elimination of damage to the black matrix layer allows for the manufacture of display sheets in close proximity to each other while maximizing the utilization of the mother sheet and the need for edge finishing of the display sheets after they are singulated. That is, the steps of mechanical grinding and/or polishing may be eliminated for display sheets where the black matrix layer present minimal or no damage as a result of the laser processing methods and systems described herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method for laser processing a substrate stack, the method comprising:
    forming a defect in a transparent workpiece of the substrate stack, the substrate stack further comprising a black matrix layer, wherein forming the defect comprises:
        directing a portion of a pulsed laser beam into the transparent workpiece wherein the pulsed laser beam comprises:
        a wavelength $\lambda$;
        a spot size $w_o$ and;
        a Rayleigh range $Z_R$ that is greater than $$F_D \frac{\pi w_0^2}{\lambda},$$

where $F_D$ is a dimensionless divergence factor comprising a value of 10 or greater, wherein:
    the pulsed laser beam directed into the transparent workpiece of the substrate stack forms a pulsed laser beam focal line disposed within the transparent workpiece, wherein a center of the pulsed laser beam focal line is offset from an edge of the black matrix layer by a distance that is about 20% or less of a total thickness of the substrate stack,
    the pulsed laser beam focal line generates an induced absorption within the transparent workpiece, and
    the pulsed laser beam focal line comprises an effective line length that is less than or equal to about 1.2 times the total thickness of the substrate stack.

2. The method of claim 1, wherein the effective line length is less than or equal to about 1.1 times the total thickness of the substrate stack.

3. The method of claim 1, wherein the cross-sectional edge of the pulsed laser beam focal line is offset from the edge of the black matrix layer by a distance that is about 15% or less of the total thickness of the substrate stack.

4. The method of claim 1, wherein the pulsed laser beam is oriented along a beam pathway and output by a beam source through an aspheric optical element, through a focusing optic and the pulsed laser beam comprises an incoming beam diameter at the focusing optic such that the pulsed laser beam directed into the transparent workpiece comprises a numerical aperture of 0.05 to 0.4.

5. The method of claim 4, wherein the aspheric optical element comprises a refractive axicon, a reflective axicon, negative axicon, a spatial light modulator, a diffractive optic, or a cubically shaped optical element.

6. The method of claim 4, wherein the beam source produces pulse bursts with 2 sub pulses per pulse burst or greater and a pulse burst energy is from about 25 µJ to about 750 µJ per pulse burst.

7. The method of claim 1, further comprising: translating the substrate stack and the pulsed laser beam relative to each other along a contour line, thereby laser forming a contour comprising a plurality of defects within the transparent workpiece of the substrate stack along the contour line; and directing an infrared laser beam onto the transparent workpiece of the substrate stack along or near the contour to separate the transparent workpiece along the contour.

8. The method of claim 1, wherein the substrate stack comprises two transparent workpieces and the black matrix layer is disposed between the two transparent workpieces.

9. The method of claim 1, wherein the transparent workpiece has combined losses due to linear absorption and scattering less than 20%/mm in a beam propagation direction.

10. The method of claim 1, wherein spacing between adjacent defects is about 25 µm or less.

11. A method for laser processing a substrate stack, the method comprising:
    forming a defect in a transparent workpiece of the substrate stack, the substrate stack further comprising a black matrix layer, wherein forming the defect comprises:
        directing a pulsed laser beam oriented along a beam pathway and output by a beam source through an aspheric optical element, through a focusing optic, and into the substrate stack such that the pulsed laser beam directed into the transparent workpiece of the substrate stack forms a pulsed laser beam focal line disposed within the transparent workpiece, wherein:
        a center of the pulsed laser beam focal line is offset from an edge of the black matrix layer by a distance that is about 20% or less of a total thickness of the substrate stack,
        the pulsed laser beam focal line generates an induced absorption within the transparent workpiece, and
        the pulsed laser beam directed into the transparent workpiece comprises a numerical aperture of 0.05 to 0.4.

12. The method of claim 11, wherein the cross-sectional edge of the pulsed laser beam focal line is offset from the edge of the black matrix layer by a distance that is about 15% or less of the total thickness of the substrate stack.

13. The method of claim 11, wherein the pulsed laser beam focal line comprises an effective focal line length that is less than or equal to about 1.2 times the total thickness of the substrate stack.

14. The method of claim 11, further comprising translating the substrate stack and the pulsed laser beam relative to each other along a contour line, thereby laser forming a contour comprising a plurality of defects within the transparent workpiece of the substrate stack along the contour line.

15. The method of claim 11, wherein the pulsed laser beam comprises an incoming beam diameter at the focusing optic such that the pulsed laser beam directed into the transparent workpiece comprises a numerical aperture of 0.01 to 0.4.

16. The method of claim 11, wherein the beam source produces pulse bursts with 2 sub pulses per pulse burst or greater and a pulse burst energy is from 25 µJ to 750 µJ per pulse burst.

17. The method of claim 11, wherein a portion of the pulsed laser beam directed into the transparent workpiece comprises:
    a wavelength $\lambda$;
    a spot size $w_o$; and
    a Rayleigh range $Z_R$ that is greater than $$F_D \frac{\pi w_0^2}{\lambda},$$

where $F_D$ is a dimensionless divergence factor comprising a value of 10 or greater.

18. A glass article comprising:
    a glass substrate having an edge defining a perimeter of the glass substrate;
    a black matrix layer disposed on the glass substrate;
    a plurality of vertical striations formed on the edge of the glass substrate, wherein:
        the plurality of vertical striations include a pitch of about 50 microns or less and extend through at least 50% of a thickness of the glass substrate and
        the black matrix layer is offset by a distance from the edge of the glass substrate by about 20% or less a total thickness of the glass article.

19. The glass article of claim 18, wherein the plurality of vertical striations extend through 100% of the thickness of the glass article.

20. The glass article of claim 18, wherein the distance between the black matrix layer and the edge of the glass substrate is about 15% or less of the total thickness of the glass article.

* * * * *

UNITED STATES PATENT AND TRADEMARK OFFICE
CERTIFICATE OF CORRECTION

PATENT NO. : 11,059,131 B2
APPLICATION NO. : 16/430985
DATED : July 13, 2021
INVENTOR(S) : Garrett Andrew Piech et al.

It is certified that error appears in the above-identified patent and that said Letters Patent is hereby corrected as shown below:

On the Title Page

In Column 2, item (56), Other Publications, Line 2, delete "USI9" and insert -- US19 --, therefor.

Signed and Sealed this
Eighth Day of August, 2023

Katherine Kelly Vidal
*Director of the United States Patent and Trademark Office*